US006418039B2

(12) United States Patent
Lentini et al.

(10) Patent No.: US 6,418,039 B2
(45) Date of Patent: Jul. 9, 2002

(54) METHOD AND APPARATUS TO DIGITALLY CONTROL TURN-OFF TIME OF SYNCHRONOUS RECTIFIERS IN ISOLATED TOPOLOGIES FOR SWITCHED MODE POWER SUPPLIES

(75) Inventors: Franco Lentini, San Gregorio; Fabrizio Librizzi, Palermo; Pietro Scalia, Palermo; Ignazio Cala', Palermo, all of (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 09/832,315

(22) Filed: Apr. 9, 2001

(30) Foreign Application Priority Data

Apr. 10, 2000 (EP) .............................. 00830274

(51) Int. Cl.[7] .............................................. H02M 3/335
(52) U.S. Cl. .................................. 363/21.06; 363/21.05
(58) Field of Search .................... 363/16, 20, 21.01, 363/21.04, 21.05, 21.06, 21.13, 21.14, 95, 97, 131

(56) References Cited

U.S. PATENT DOCUMENTS

| 5,907,481 | A | | 5/1999 | Svärdsjö | 363/25 |
|---|---|---|---|---|---|
| 6,026,005 | A | * | 2/2000 | Abdoulin | 363/89 |
| 6,049,471 | A | | 4/2000 | Korcharz et al. | 363/20 |
| 6,246,593 | B1 | * | 6/2001 | Cheng | 363/17 |
| 6,310,466 | B1 | * | 10/2001 | Criscione | 323/222 |

FOREIGN PATENT DOCUMENTS

EP   0 884 829 A1   12/1998

OTHER PUBLICATIONS

Bitenc, B., "Highly Efficient DC/DC–Converter for a 160GBIT ATM–SWITCH," *IEEE*, New York, Jun. 6–9, 1999, pp. 1–8.

* cited by examiner

*Primary Examiner*—Matthew Nguyen
(74) *Attorney, Agent, or Firm*—Lisa K. Jorgenson; Robert Iannucci; Seed IP Law Group, PLLC

(57) ABSTRACT

Presented is a circuit and method capable to digitally control and, in particular, to control the switching of one or two MOSFETs used as rectifiers in switched mode power supply isolated topologies. Basic circuit implementation of the presented technique is also introduced. A controller has a fixed frequency square wave signal main clock input, generically switching from a low to a high value in two different time intervals. The controller has one or two square wave outputs, swinging from low to high in phase or in opposite with respect to the clock signal. The digital control method is able to generate output signals timed to anticipate output transitions from high to low level with respect to the clock signal transitions. In the control scheme, one or two other secondary inputs set the amount of anticipation time of the respective transitions of the outputs. In isolated SMPS topologies with the PWM controller located on the primary side, the clock signal is derived from the secondary output of the isolation transformer, while the outputs are meant to drive one or two MOSFET gates. The method is able to provide the proper gate drive signals, solving all the known problems in controlling synchronous rectification.

19 Claims, 23 Drawing Sheets

METHOD AND APPARATUS TO DIGITALLY CONTROL TURN-OFF TIME OF SYNCHRONOUS RECTIFIERS IN ISOLATED TOPOLOGIES FOR SWITCHED MODE POWER SUPPLIES

TECHNICAL FIELD

This invention is directed toward switched mode power supplies, and more particularly, to a method and device for controlling synchronous rectifiers used within a switched mode power supply.

BACKGROUND OF THE INVENTION

In the power conversion area, especially in low DC output voltage converters, the utilization of MOSFETs as rectifiers is a technique increasingly used for the beneficial effect on efficiency due to the low conduction losses on these devices.

The way the synchronous rectifiers (SRs) are controlled is fundamental for the correct operation of the circuit. Proper techniques have therefore to be used to drive these SRs according to the law of the diode that the SR is meant to replace. This driving signal is derived from the main PWM control signal, which determines the different states of the switch mode circuit and therefore the operating conditions for the diodes of the circuit.

The way the driving signal can be derived from the main PWM signal to properly control SRs depends on the kind of topology used, and on the presence of voltage isolation in that topology. In a non-isolated switched mode power supply topology, the synchronous rectifier control circuit can get the information about the switching transitions (turn-off and turn-on) of the main switch from the main control circuit in a very simple way.

In isolated topologies with a primary side control, the absence of a PWM controlling signal on the secondary side of the isolation barrier makes the generation of the proper control signals for the SRs even more difficult.

If the equivalent diode law is not respected, the well known phenomena of cross conduction and shoot-through between switches will occur, as described in detail below. In all of these circumstances, one of the switches is forced to conduct in the first quadrant, opposite to its useful sense of conduction as a diode. Therefore, switching losses can become predominant, wasting most of the benefits introduced by the reduction of conduction losses by the rectifiers, or can even prevent proper operation of the circuit.

The required timing of the driving signal for the synchronous rectifier is shown in FIG. 2, having to a general switch mode topology configuration with one switch and only one diode, where the conduction times possible for switch and diode are complementary.

The dead time intervals shown in that figure prevent contemporary cross-conduction of the main switch and the SR, but they must be reduced to the lowest possible time value to minimize SR parasitic diode conduction times, and the consequent lost of efficiency.

In fact, an important issue in control of MOSFET SRs is related to the body-diode behavior. Physical MOSFETs used as SRs show, in fact, bad characteristics in terms of a parasitic diode, whose operation is involved at least during transitions between different states.

The operation of the body-diode is dependent on the timing of the driving signals, and in particular by the turn-off instant of the SR with respect to the time interval in which the diode (which has been replaced by a MOSFET SR) is supposed to be conducting.

A too early turn-off of the SR will cause an increase of conduction losses due to the body-diode drop which will therefore conduct all the current. The switching losses caused by the reverse recovery current of the body-diode will be dependent by the carried current at the instant in which the voltage between anode and cathode reverses, becoming negative.

In isolated topologies, if the main PWM is located on the secondary side, the task of driving synchronous rectifiers can be easily solved. In fact, because the PWM signal is available on the secondary side, it can be used to generate the driving signal for the SRs. Delays can be added to the PWM signal to compensate the propagation delays which are suffered by the driving signal transferred to the primary side through some coupling device. The required timing for this kind of operation is shown in FIG. 3, in the more general case of two complementary signals on the secondary side. Even in this application, dead times among driving signals are necessary to prevent eventual cross conduction between the SRs and between SRs and the main MOSFET.

However, secondary side control configuration shows several system disadvantages, such as requirement of an auxiliary power supply for startup of the converter, requirement of a crossing-isolation circuit able to transfer the PWM control driving signal to primary switches, and difficulties to transfer the information about the primary switch current to the PWM controller in current mode control loops. Therefore, the use of PWM control on the primary side is mandatory to realize switched mode power supplies (SMPS) with top performances in terms of high efficiency, small dimensions and low cost.

In isolated topologies, if the main PWM control circuit is on the primary side, its signal cannot be available on the secondary side in a simple, effective and cheap way. This information can be however derived on the secondary side from the output of the isolation transformer. In this case, however, it is noted that the synchronizing signal withdrawn at the output of isolation transformer is the effect of primary main switch commutations. This signal, in fact, shows a behavior similar to the main PWM signal, at least in continuous conduction mode (CCM), but it is affected by the parasitic elements of the circuit. In addition, if the CCM working condition is not respected, it may also present some oscillations during part of the signal, which can determine false driving information. Therefore, the control technique meant to provide SR driving signals has to be able to prevent eventual rising of wrong operative conditions derived by any timing effects on the synchronization of the signal available on the secondary PWM synchronization signal with respect to the primary PWM signal.

Using the output of the isolation transformer as the PWM synchronization signal, a very simple way to make MOSFETs operate as rectifiers in isolated topologies based on forward topology is a technique called "self-driven synchronous rectification."

A very basic example of this technique, which has been developed in many different proprietary versions, is provided in the single ended forward topology of FIG. 4A.

If the gate of MOSFET 3 is connected to node 5, and the gate of MOSFET 4 is connected to node 6, the two MOSFETs are driven correctly, according to the equivalent diodes law. Unfortunately, this technique suffers a very serious inconvenience. As it can be observed in the related timing diagram of FIG. 4B, the driving signal is dependent on the way in which the main transformer is demagnetized during a magnetic reset. As a consequence, the time in which the body diodes of the MOSFET 4 is forced to conduct can be very large, due to the fact that the driving signal for the gate is missing. This fact damages the main benefits introduced by synchronous rectification, restricting the use of this method for driving SRs only in combination with some particular, and proprietary magnetic reset techniques.

In addition, this technique is hard to implement when the primary input voltage has a very wide range of variation. Common factors are limited to about 2:1, because it is difficult to always provide a driving signal value compatible with the appropriate ranges of the gates.

Therefore, in isolated topologies with primary side control, the most proper approach to drive SRs requires a control circuit able to handle the synchronization signal (clock) separate from the output of the isolation transformer, and to solve any other problem regarding the timing of the driving signals (Out$_1$, Out$_2$) with respect to the clock input. In FIG. 5, the general Clock signal at a fixed switching frequency, with primary switch On and Off time intervals is shown.

The control circuit has to deal with proper timing generation of the SR driving signal from the clock signal input. According to FIG. 2, and as already explained, proper deadtimes between the clock signal and the SR driving signal must be provided to avoid cross conduction between devices.

Another well known phenomenon to be dealt by the controller is the so-called shoot through problem, that may happen on the secondary side of an isolated topology. The specific mechanism of this improper operation condition is dependent by the circuit topology, and it will be discussed in detail below. In general, while the transition in which a synchronous rectifier has to be turned on is easy to implement, the turn-off transition requires a special treatment. In fact, the circuitry that generates the driving signal from the clock introduces a propagation delay, which is added to the one coming from the isolation transformer. This intrinsic delay in generating the SR transition creates the deadtime necessary to avoid improper circuit conditions. However, this delay, bringing in terms of loss of efficiency because it causes body diode conduction, has to be minimized for efficiency optimization.

Instead, the turn-off transitions in FIG. 5 shown as Transition A for Out$_1$, and Transition B for Out$_2$, if not properly handled, can bring the circuit to a very critical behavior. In fact, in this case, the intrinsic delay generates a late turn-off of the bi-directional synchronous rectifier switches, creating improper circuit conditions. These improper circuit conditions are normally made impossible by the presence of the unidirectional diodes. The general condition can be defined as the creation of short circuit loops, which can generate very high current peaks, limited only by the parasitic elements in the circuit. The particular analysis of this phenomenon will be described in details for each of the main isolated topology family.

Therefore, the introduction of a special deadtime is necessary, which is able to avoid the generation of the improper operation conditions. This deadtime can be realized by generating a proper anticipation of the turn-off transition, which guarantees that the SR can be off before the clock signal transition. This anticipation, however, as in the turn-on transition, has to be minimized to reduce the body-diode conduction time, to avoid penalties on the efficiency. In particular, the amount of anticipation can be used as an optimization parameter to adjust the operation of the circuit to its physical implementation by design. In fact, the time slope of the decreasing current on the SR, which has been turned off, is dependant on several parameters like input and output voltage of the converter, the amount of previously driven current, and most importantly by the parasitic elements in the circuit like the leakage inductance. The anticipation time can be adapted to the specific operation condition of the circuit to achieve the best performance in terms of efficiency, setting to a minimum the conduction times of the body-diodes and the consequent reverse recovery currents.

In FIG. 5 the required anticipation intervals, denominated $\Delta T_1$ and $\Delta T_2$ are introduced in the most general case of two complementary outputs generated from a clock input.

The mechanism of generation of the shoot-through will be now examined for the main isolated topologies of SMPS converters.

A single ended forward topology power supply circuit is displayed in FIG. 6. Operation of this circuit shows evidence in particular of the eventual generation of the shoot-through.

A synchronous rectifiers control circuit 7, receiving the clock information from the voltage at a circuit node 8, generates the MOSFET driving signals for an SR 9, which is working as a forward rectifier, as well as generating driving signals for an SR 10 which is working as free-wheeling for the current of an output inductor 11.

In particular, in this kind of circuit configuration, when a primary MOSFET 12 is turned on by a PWM controller 13, the SR 9 must also be on and the SR 10 must be off. On the contrary, when the primary MOSFET 12 is off, the SR 10 must be on and the SR 9 must be off.

The voltage formation on node 8 shows some delay with respect to the primary MOSFET 12 drive signal, mainly coming from parasitics of an isolation transformer 14. This delay, added to the propagation delay of the SRs controller 7, causes a delayed turn-off of the SR 9 or of the SR 10, and, as a consequence, shoot-through on the secondary output of the isolation transformer loop occurs in both transitions in which the MOSFET 12 is turned-on or off.

In fact, when the MOSFET 12 is turned-on, the voltage node 8 tends to go positive. This voltage forward biases the body diode of the SR 9 and, due to the delay in turning off the SR 10, an unlimited current can flow in the short circuit loop formed by the SR 10, the body-diode of the SR 9 and the secondary winding of the isolation transformer 14. The value of the short circuit current is only limited by the parasitics of the circuit and eventually by the primary side protection circuits included in the PWM.

In the other transition, when the MOSFET 12 is turned off, the voltage on node 8 goes negative. If the SR 9 is still on due to the delay of the clock input formation, this negative voltage forward biases the body-diode of the SR 10, and a short circuit loop is formed by the body-diode of the SR 10, the SR 9 (still on) and the secondary winding of the isolation transformer 14.

The detailed timing of the SRs turn off transitions relative to the forward topology circuit is shown in FIG. 7. In both the two SR turning-off transitions for the free wheeling SR 10 (FW), and for the forward rectifier SR 9 (FR), the time interval $t_0$-$t_1$ is the amount of anticipation, while $t_0$-$t_3$ is the entire deadtime between the two complementary driving signals. In the interval $t_0$-$t_2$ the body-diode conducts, reversing after $t_2$.

A flyback topology circuit is displayed in FIG. 8. Most of the considerations made for the forward topology circuit of FIG. 6 are still valid, but, in this case, the topology shows only one MOSFET working as a rectifier 15.

The SR 15 has to be turned on when the main primary switch 12 is off and vice-versa. When the MOSFET 12 is turned on, the voltage at the output of the isolation transformer 14, referenced by node 16, goes from $V_o$ to $-V_{in}$, and if the SR 15 is not already off, a short circuit loop is generated with an output capacitor 17 put in parallel to a negative voltage that tries to impulsively discharge the capacitor with an unlimited current. This causes an unavoidable serious drop in the regulated output voltage. The detailed timing of the SR turn-off transition, relative to the flyback topology circuit of FIG. 8 is shown in FIG. 9. It is apparent that the flyback topology circuit suffers from the same problems as the forward topology circuit.

Similar consideration are valid for all the forward derived double ended isolated topologies (push-pull, half bridge, full bridge), displayed in FIG. 10.

In FIG. 10, a first synchronization clock input taken from a node 20 is used by an SR control circuit 21 to generate the proper timing signal for an SR 22. In a similar way, a second synchronization clock input taken from a node 23 is used to generate the proper timing signal for an SR 24. In both cases the synchronization clock and the relative output driving signal are displayed in FIG. 11. In this case, the anticipation times in turning off the MOSFETs are necessary to avoid loss of all the energy stored in the transformer leakage inductance, in the short circuit loop formed in both transitions by the two SRs (one SR and one body-diode) and the secondary winding of the isolation transformer, with a worsening of the converter efficiency.

The detailed timing of the SRs turn-off transitions (two identical), relative to the forward double-ended topologies circuit is shown in FIG. 11.

A control driven approach implementing an analog method to generate the anticipations of the turn-off transition in the driving timing, is disclosed in U.S. Pat. No. 5,736,890 to Yee et al. Part of the method appears to be implemented in a preliminary silicon from SRMOS Inc. (public advertising since November 1999).

This analog method uses two different analog ramps and one threshold variable with $T_{ON}$ or $T_{OFF}$, in order to generate the anticipation time. Three passive components (capacitors) are needed to generate the ramps and the variable threshold. Two of these capacitors have to be accurate in order to have a precise anticipation time. Stability in time and temperature are not good due to the dependence on passive components.

Another control driven approach, using a Phase Lock Loop (PLL) based system to realize the anticipations of the turn off transitions, has been recently implemented by International Rectifier, in a preliminary IC, IR1175 (public advertising since January 2000). This method is quite complex in terms of design relations needed to set the desired control, requiring a large amount of external components and relatively high pin count needed to set all the parameters that are necessary for the correct operation of the control technique. Beside this, the method presents a slow response time to switching frequency variations. If some noise problem causes a variation in the switching frequency, the Phase Lock Loop is slow to react to this variation, with a consequent wrong generation of the anticipation times, causing loss of overall efficiency of the converter. A faster response time can be achieved to the detriment of a worse accuracy of the anticipation time, which is also a cause of negative effect on the efficiency of the converter.

Until now, no adequate device and method to control MOSFET synchronous rectifiers in a switched mode power supply that minimizes short circuiting due to improper control timing of the MOSFET synchronous rectifiers was available.

SUMMARY OF THE INVENTION

Embodiments of the invention use a control-driven approach to drive synchronous rectifiers in SMPS isolated topologies. The control-driven technique presents several advantages with respect to the self-driven approach.

The technique conveniently uses the PWM controller on the primary side of the isolated topology, deriving synchronization information directly from the secondary side. It realizes independence from the isolation transformer reset technique, because the conduction time of the body-diode of the MOSFETs is minimized, while the driving signal values can be always made compatible with the gates ranges. It is also possible to allow discontinuous conduction mode operation of the converter.

Presented is a switched mode power supply that includes a transformer with primary and secondary windings, a primary power transistor coupled to the primary windings, and a switched synchronous rectifier coupled to the secondary windings of the transformer. A digital controller is provided to control the operation of the switched synchronous rectifier. The controller accepts an anticipation value at an input, and then compares a clock signal and a generated internal clock signal to one another with reference to the anticipation value. When the comparison is finished, a signal is generated to drive the switched synchronous rectifier, and the cycle repeats itself.

In other embodiments, two sets of comparison circuitry are available to drive a first and a second switched synchronous rectifier. The comparison circuitry can be realized using a set of up/down counters, and can be controlled by finite state logic.

DETAILED DESCRIPTION OF THE PREFERRED EMBODIMENTS

All the prior art techniques that are based on analog approach to implement the turn-off transitions anticipation function, show weakness due to the need of several external components, mainly capacitors with very tight tolerance, and stability needed to allow the correct operation of the relative technique and apparatus.

Other prior art techniques that use the PLL approach to create the turn-off transitions anticipation function require a very large number of external components, causing a high pin count in the synthesizing device, necessary to set all the parameters that are used for the proper operation of the control method, by means of complex design relations. In addition these prior art circuits show very slow response to transients, due to switching frequency and duty-cycle perturbations, which reflects negatively on the overall efficiency of the converter.

The presented method and the related implementing apparatus show several advantages and benefits over those circuits of the prior art. An embodiment of the invention solve the known operation problems regarding the generation of synchronous rectifier driving signals, like cross-conduction, and shoot-through, while it minimizes body-diode conduction. In particular the presented digital technique uses the implementation of a straightforward circuit configuration when inserted in an SMPS topology circuit. The synthesizing device can be formed with a very minimal pin count. No particular accuracy, or stability in time and temperature is required for the eventual external components, resistors, to be used to set the anticipation times. In addition the method shows excellent characteristics in terms of fast response to transitions coming from converter switching frequency and duty-cycle sudden variations.

The method herein disclosed is fast because the circuit control is made cycle-by-cycle, so it acts suddenly on the next successive cycle after a disturbance of the steady state occurs. In addition, due to the high flexibility of the digital approach, eventual correctional algorithms can be easily implemented in the switching frequency synchronization, generating error correction procedures and similar improvements of the presented approach.

A minor limitation of the method resides in the fact that the anticipation time can be only by discrete steps, due to the digital nature of the method, making the theoretical efficiency optimization process only partial. However, the time step can be reduced by increasing the internal digital oscillator frequency, so that a more precise resolution can be achieved, and consequently a more flexible determination of switching timing. By increasing the internal oscillating frequency, this efficiency can be made very large.

The presented method generates proper driving signals for synchronous rectifiers from a clock signal input, related to the main PWM signal of the switch-mode circuit.

Figure 1A:
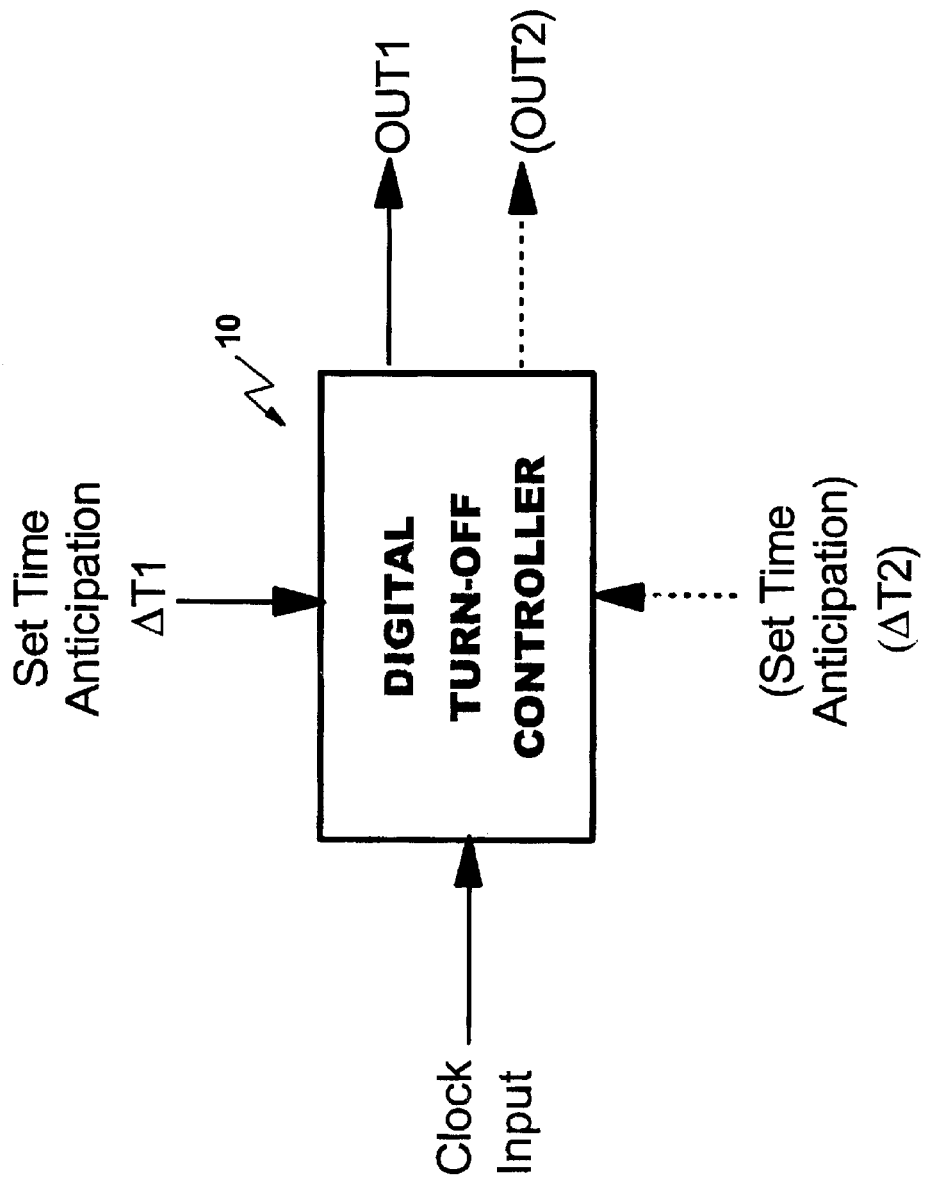
FIG. 1A is a block diagram showing the input and output connections of a digital controller device according to an embodiment of the invention.
Figure 1B:
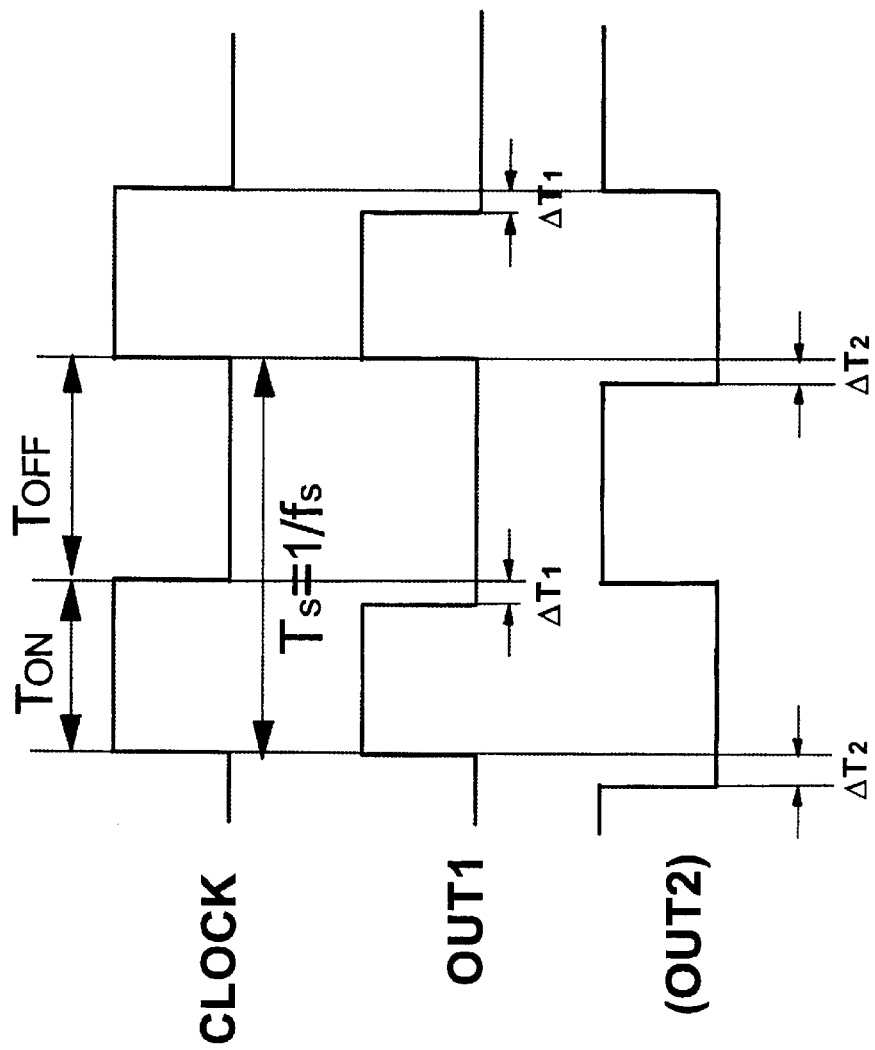
FIG. 1B is a timing diagram showing an input signal and two output signals generated by a digital controller device according to an embodiment of the invention.
Figure 2:
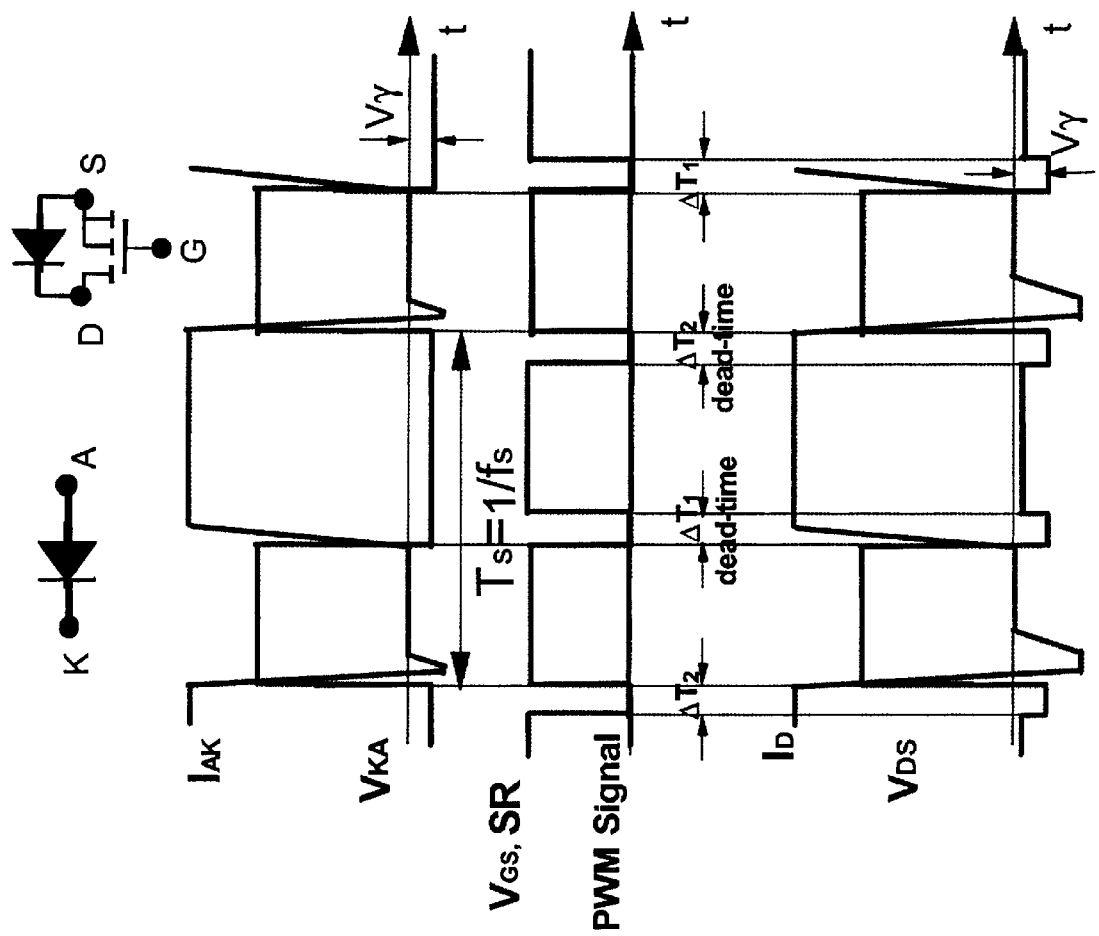
FIG. 2 is a timing diagram showing driving signals for a prior art synchronous rectifier.
Figure 3:
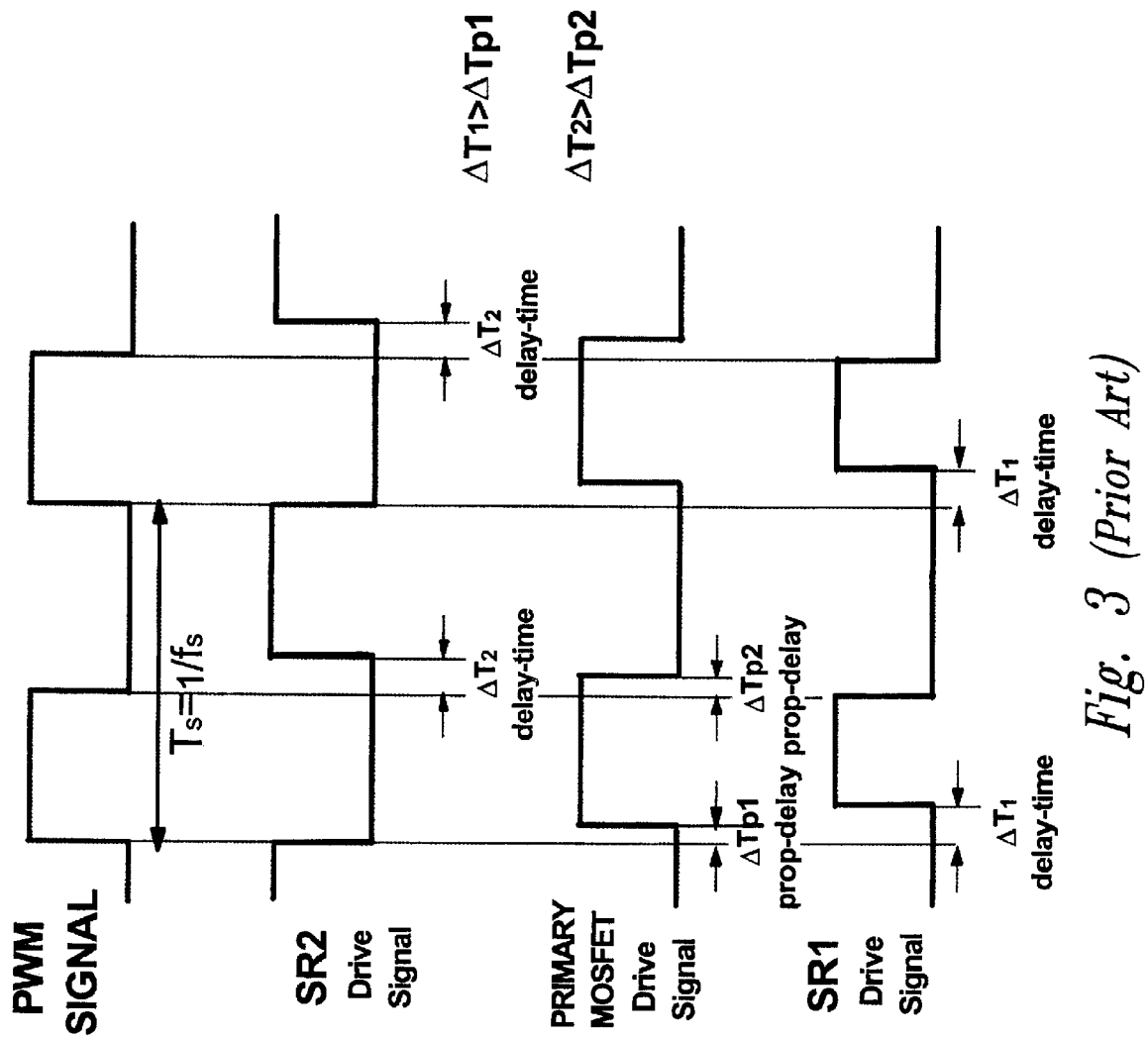
FIG. 3 is a timing diagram showing signals for an isolated topology power supply of a prior art control device.
Figure 4A:
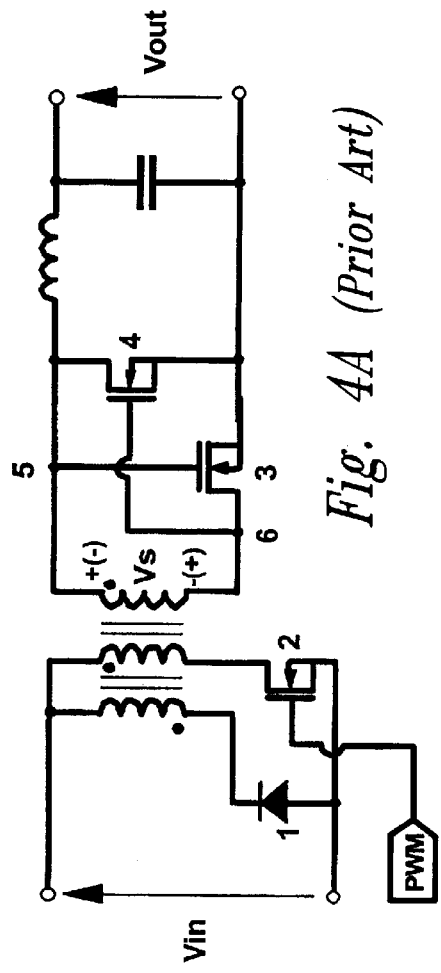
FIG. 4A shows a proprietary forward topology power supply according to the prior art and FIG. 4B is a timing diagram showing signals generated by the prior art control device shown.
Figure 4B:
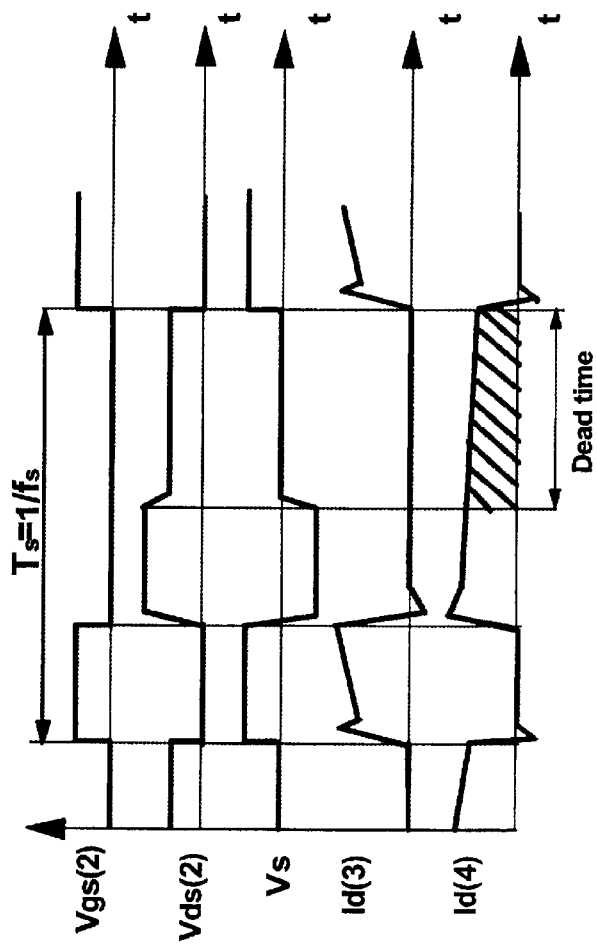
Figure 5:
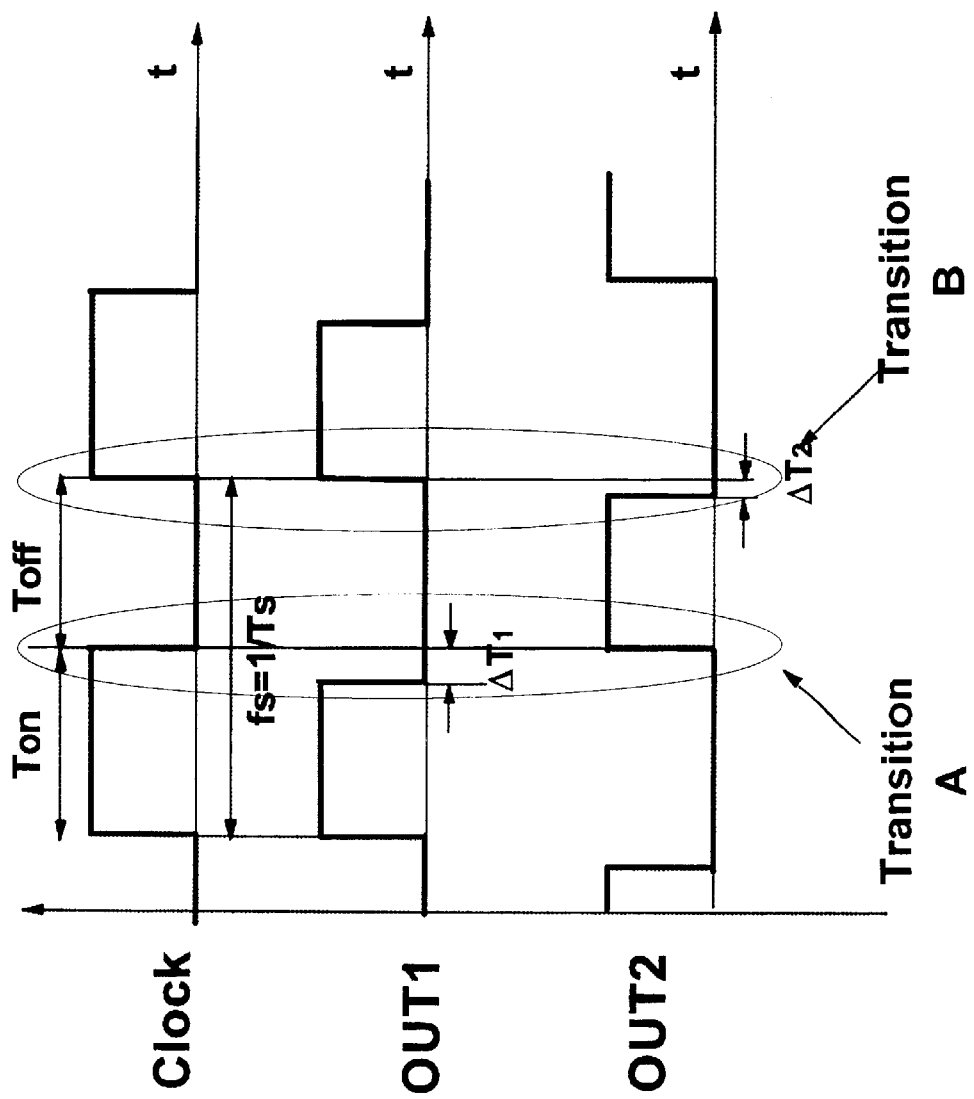
FIG. 5 is a timing diagram showing the timing of output driving signals with respect to a clock signal input.

In general, the presented circuit has the structure as shown in FIG. 1A. A digital controller 30 accepts as inputs a clock, and a first and second anticipation times. Based on those signals, the digital controller 30 produces control signals $OUT_1$ and $OUT_2$ for the gates of the MOSFET synchronous rectifiers. In particular the circuit operates according to the timing displayed in FIG. 1B, generating proper anticipation times corresponding to the turning off transitions of the outputs.

These functions are implemented through the concept of synchronizing the operation of the control circuit to the clock signal at the converter switching frequency, and in particular to its transitions. This is performed by means of two digital counter blocks which play different roles: one operates the measure of the intense switching period, cycle-by-cycle, storing this information for the next cycle. The other one makes the same measurements for the On or Off time of the clock signal according to the specific need of the circuit topology.

The precision and resolution of the system is directly related to an internal digital frequency of operation used to implement this method. Because the period and On/Off time intervals parameters of the previous cycle are available, a proper timing of the outputs can be generated of the following cycle, and in particular a proper anticipation on the turning off transitions can be set. The amount of the anticipation can be set accordingly with the resolution of the system, in terms of discrete quantities of minimum digital pulse period.

Timing of the presented control technique will be shown below, together with the detailed explanation of the control method operation, according to the non-limiting description of the apparatus through which it is implemented.

Figure 12:
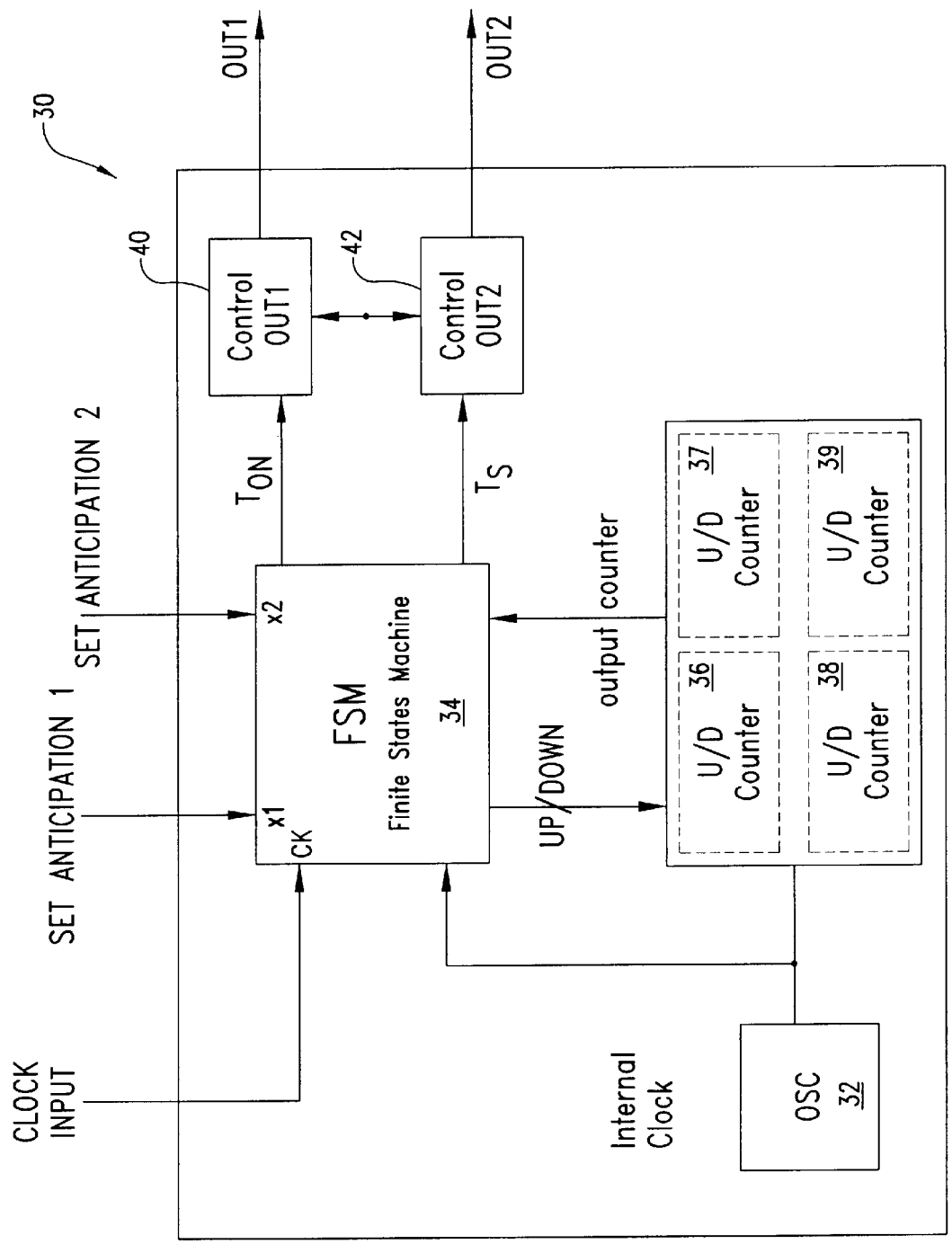
FIG. 12 is a block diagram showing the digital controller according to an embodiment of the invention.

In the more general case of two complementary signals on the secondary side, the general structure of the digital controller 30 includes an internal clock oscillator 32; a finite state machine 34; pairs UP/DOWN counters 36,37,38,39; and first and second control output logic blocks 40, 42, as shown in FIG. 12. This digital controller 30 has three inputs and two outputs. The inputs are the clock (CK), and the anticipation time setting for the $OUT_1$ (x1) and the anticipation time setting for the $OUT_2$ (x2). The outputs are the driving signals for the two MOSFETs on the secondary side of the converter ($OUT_1$, $OUT_2$).

The clock signal CK, input into the digital controller 30, has a square wave signal having a frequency $f_s$ and a period $T_s$. The finite state machine, synchronized with a rising edge of the internal oscillator clock signal $CK_1$ at frequency $f_1 > f_s$ (period $T_1$) is the brain of the system and generates the two signals $OUT_1$ and $OUT_2$ without any overlap in turn on and turn off conditions. The anticipation times are externally set through the relative inputs x1, for set anticipation 1, and x2, for set anticipation 2. The four counters each have a DOWN phase in which the counter anticipates the turn off of a corresponding one of the outputs $OUT_1$. The four counters also each have an UP phase in which the counter UP continuously obtains get the information about the duration of the switching period for the $OUT_2$, or about the duration of the $T_{on}$ time for the $OUT_1$. In this way, during a switching period, the anticipation in the turn off of the outputs is based upon the information stored in the most immediately previous switching period. A continuous monitoring of the switching period and of the $T_{on}$ time is obtained cycle by cycle. The number of bits of the counters 38, 39 relative to the $OUT_2$ are chosen according to the operating switching frequency range of the converter, and according to the frequency $f_1$ of the internal oscillator. The numbers of bits of the counters 36, 37 relative to the $OUT_1$ are chosen according to the operating $T_{on}$ time of the converter and according to the frequency $f_1$ of the internal oscillator.

Figure 13:
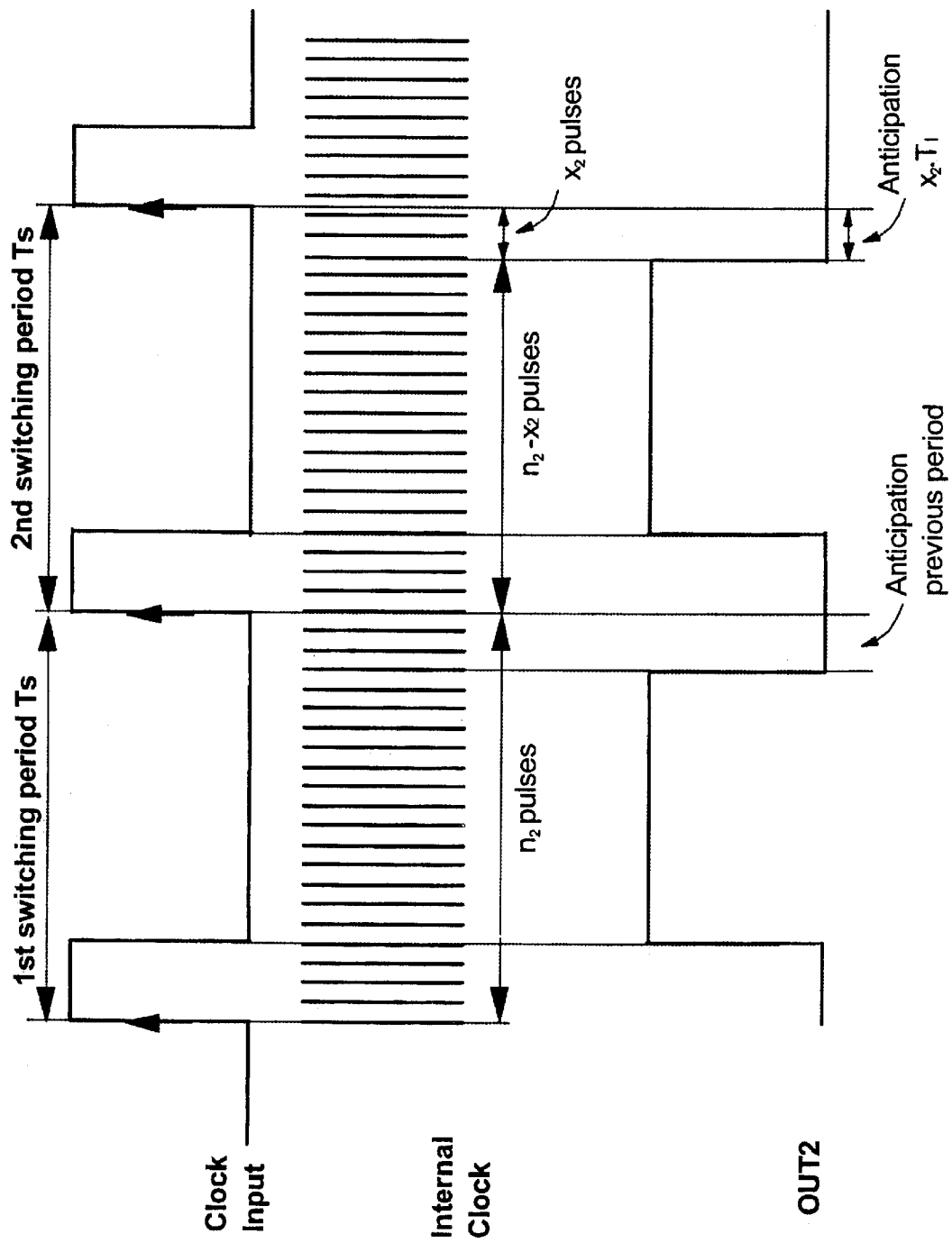
FIGS. 13–19 are timing diagrams showing signals used by and generated within the digital controller shown in FIG. 12.

In steady state conditions (fixed switching frequency and fixed duty-cycle), for two consecutive switching periods, the part of the system relative to the $OUT_2$ operates as follows (FIG. 13). During a first switching period $T_s$, on the rising edge of the clock input CK, the first counter 38 for the $OUT_2$ starts to count in its UP phase the pulses of the internal clock ($CK_1$). On the next rising edge of the clock input CK, (the end of the first period $T_s$) the counter 38 stops its calculation. The number of pulses counted ($n_2$) takes account of the duration of the switching period. This information is stored in order to be used in the next switching period.

During the second switching period, on the rising edge of the clock input CK, the counter 38 counts during its DOWN phase the pulses of the internal clock stopping its calculation at $n_2$-$x_2$. At this time the $OUT_2$ is turned off. The second counter 39 for the $OUT_2$, counting the new number of pulses of the internal clock $CK_1$ during its UP phase, updates the information about the duration of the switching period $T_s$. During the next (third) switching period, the counter 38 returns to its UP phase and the counter 39 returns to its DOWN phase.

The amount of anticipation in turning off the $OUT_2$ is given by ($x_2$*$T_1$), and is set by the $OUT_2$ anticipation time input. In each period the function of the counters, UP or DOWN, is exchanged with respect to the previous period.

Figure 14:
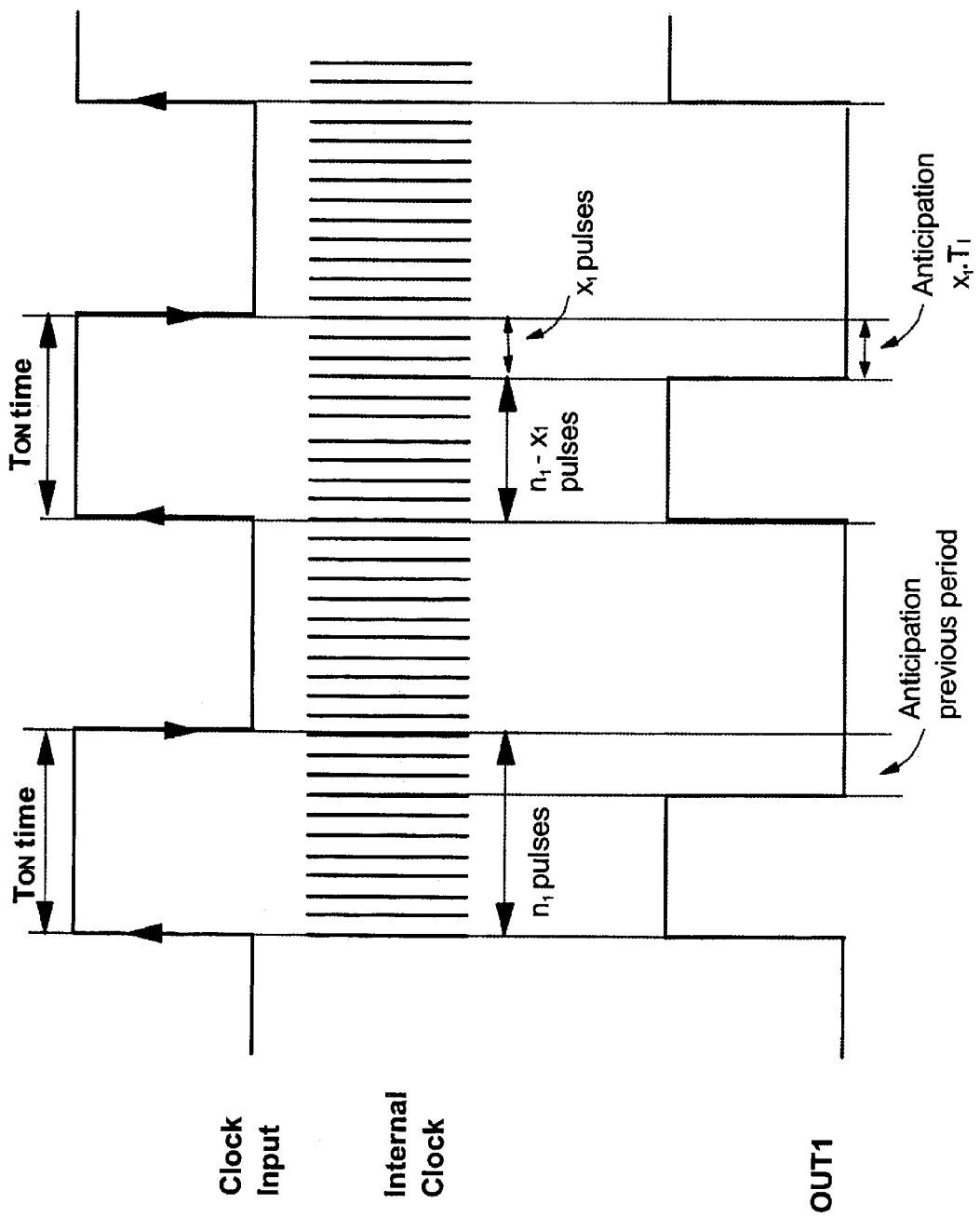

For the part of the digital controller 30 relative to the $OUT_1$, the other UP/DOWN counters 36, 37 take into account the information about the duration of the TON time used to anticipate the turn off of the $OUT_1$ (FIG. 14).

During the first switching period, the first counter 36 for the $OUT_1$ starts to count the number of pulses of the internal clock $CK_1$, on the rising edge of the clock input CK, and stops its calculation on the falling edge. The number of pulses of $CK_1$ counted is $n_1$, and this information takes in account of the $T_{ON}$ time.

During the second switching period, the first counter 36 counts during its DOWN phase the pulses of the internal clock $CK_1$, stopping its calculation at $n_1$-$x_1$ which gives an anticipation in turning off the $OUT_1$ equal to ($x1$*$T_1$), this anticipation is set through $x_1$, the anticipation time 1 input. The second counter 37 for the $OUT_1$ counts upward the number of pulses of the internal clock $CK_1$ between the rising edge and the falling edge of the clock input CK during the current period during its UP phase. During the third switching period, the counter 36 returns to its UP phase and the counter 37 enters its DOWN phase to count $n_1$-$x_1$ pulses in order to turn off the $OUT_1$.

Figure 15:
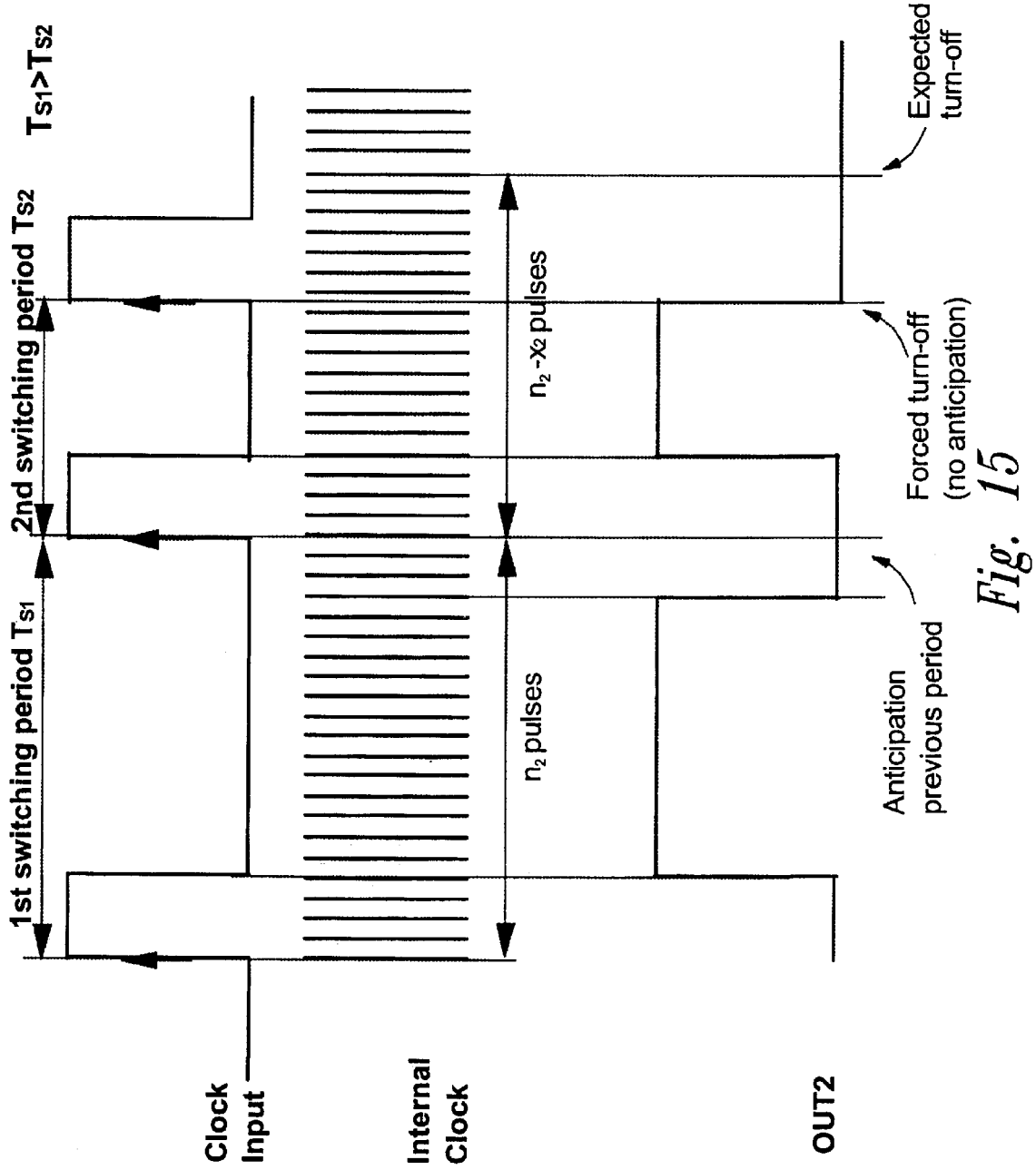

For the $OUT_2$, when a variation in the switching frequency occurs, three different cases are possible:

First, the switching period in which the anticipation is realized could be smaller than the previous period (FIG. 15). Normally, with the described way of operation, the turning off of the $OUT_2$ would be delayed and not anticipated with respect to the clock input CK. In the digital controller 30, this condition is avoided forcing, in any case, the turn-off of the $OUT_2$ with the rising edge of the clock input.

Figure 16:
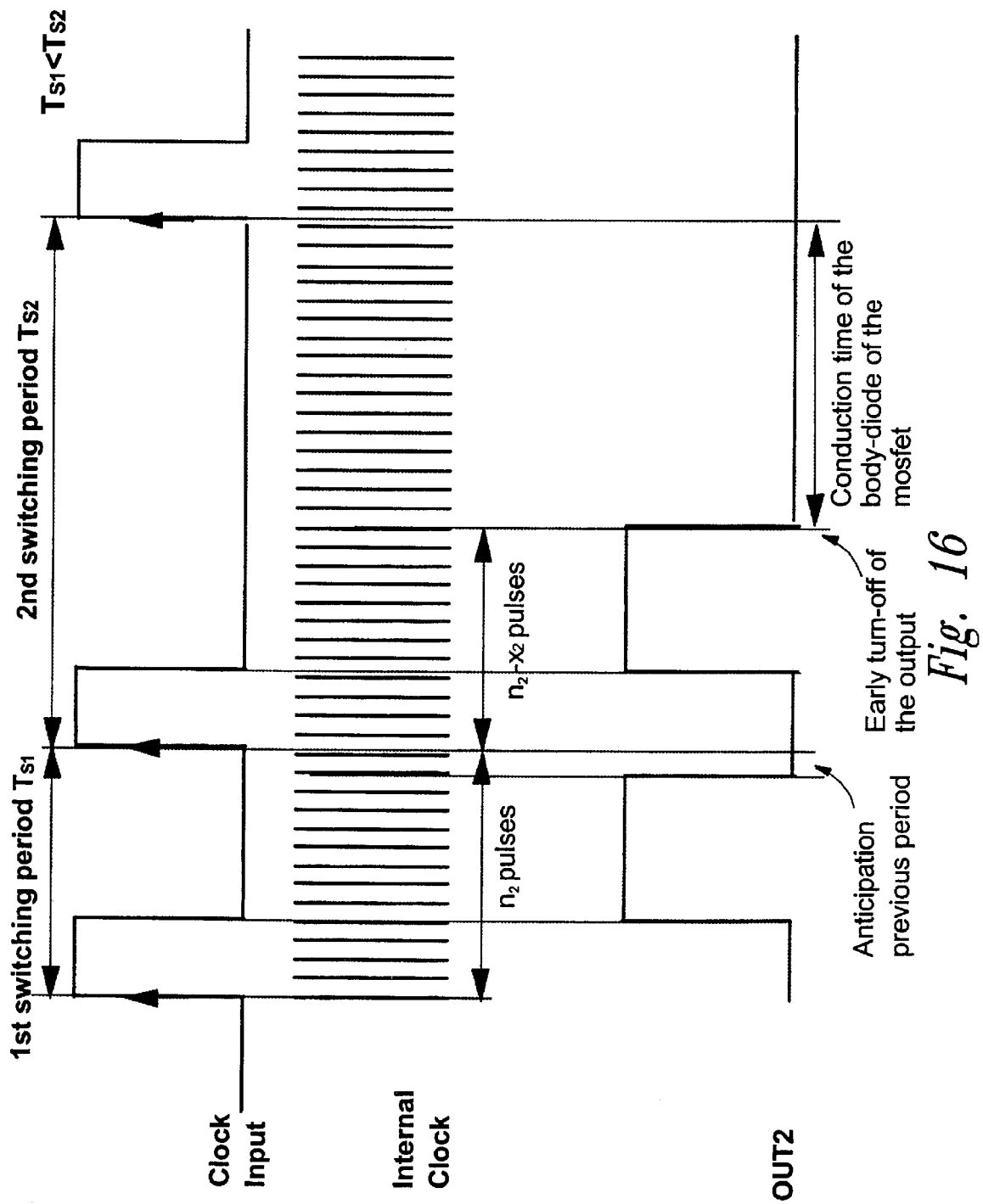

Second, the switching period in which the anticipation is realized could be larger than the previous period (FIG. 16). In this case, the digital controller 30 causes of an early turn off of the $OUT_2$. The conduction time of the body diode of the MOSFET is not minimized, but this larger conduction time of the body diode of the MOSFET is present only for one clock cycle CK, and the loss of efficiency of the SMPS circuit is very low.

Figure 17:
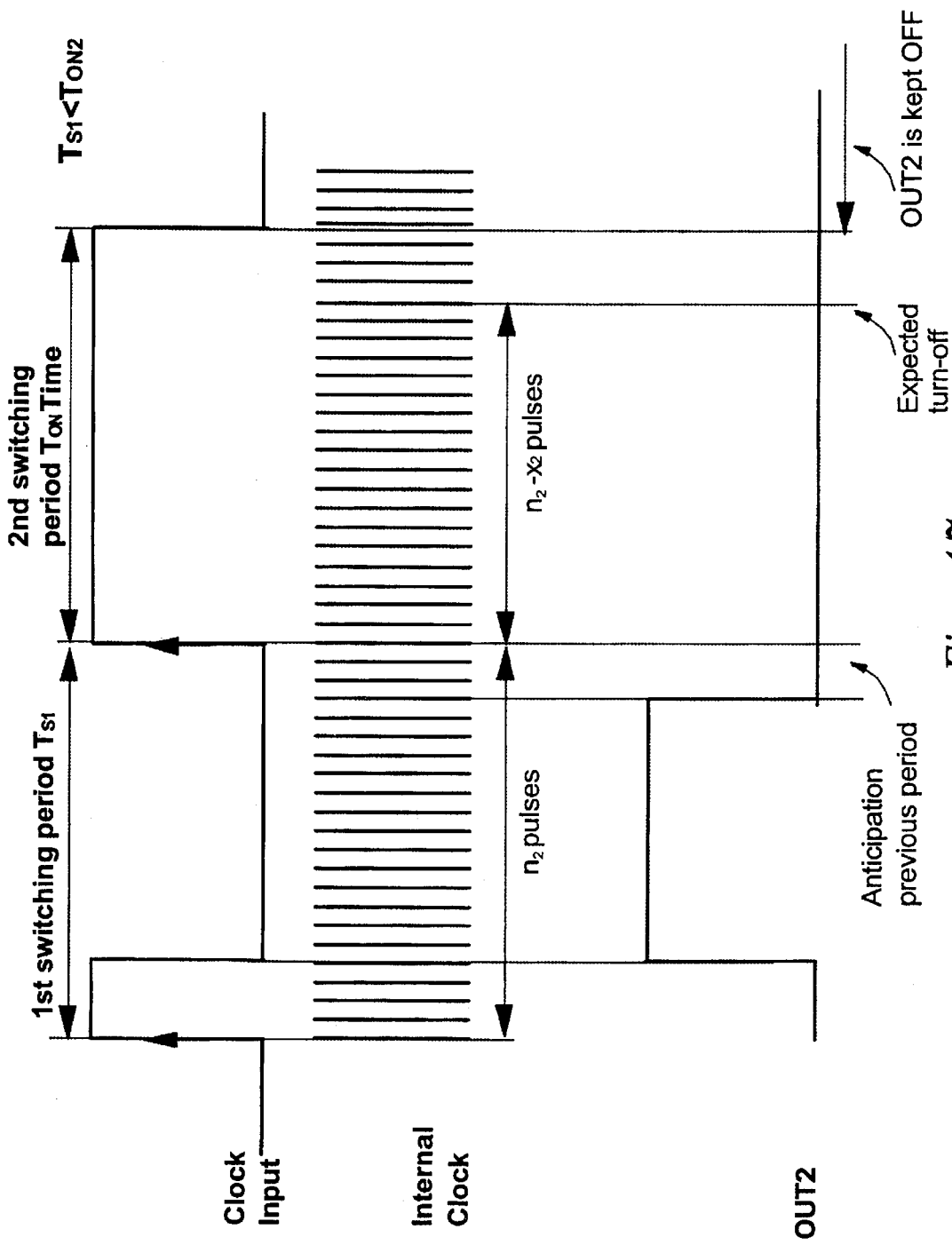

Third, the switching period in which the anticipation is realized could have a TON time equal or larger than the previous period (FIG. 17). In this case the digital controller 30 keeps the $OUT_2$ OFF. Even in this case, the conduction time of the body diode of the MOSFET is not minimized for only one cycle causing a very low loss of efficiency.

For the $OUT_1$, when a variation in the $T_{ON}$ time occurs, two different cases are possible.

Figure 18:
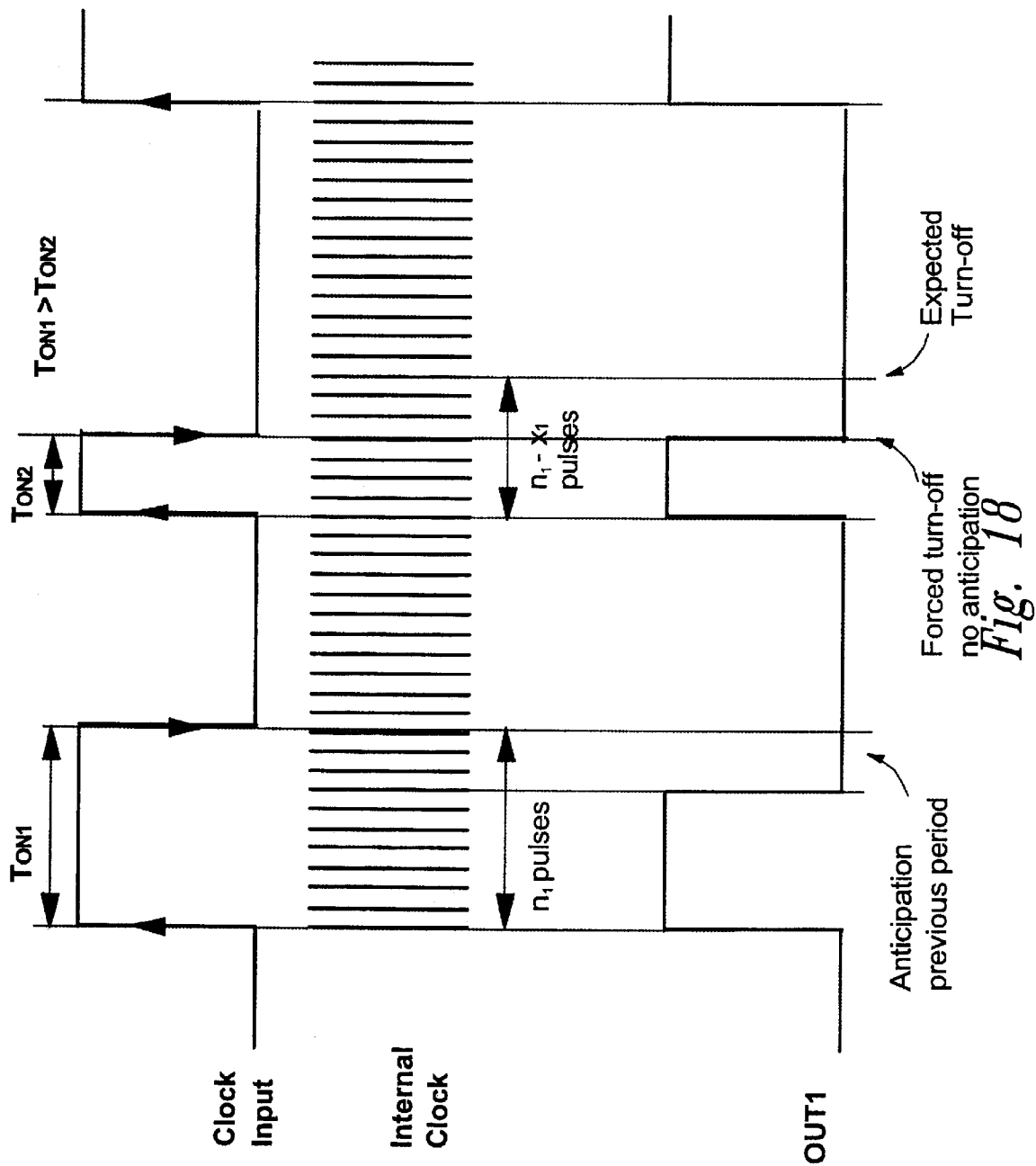

First, the TON time in which the anticipation is realized could be smaller than the previous $T_{ON}$ time (FIG. 18). With the described way of operation, the turn off of the $OUT_1$ would be delayed and no anticipation with respect to the clock input signal CK would be made. The digital controller 30 avoids this condition by forcing in any case the turn off of the $OUT_1$, with the falling edge of the clock input signal CK.

Figure 19:
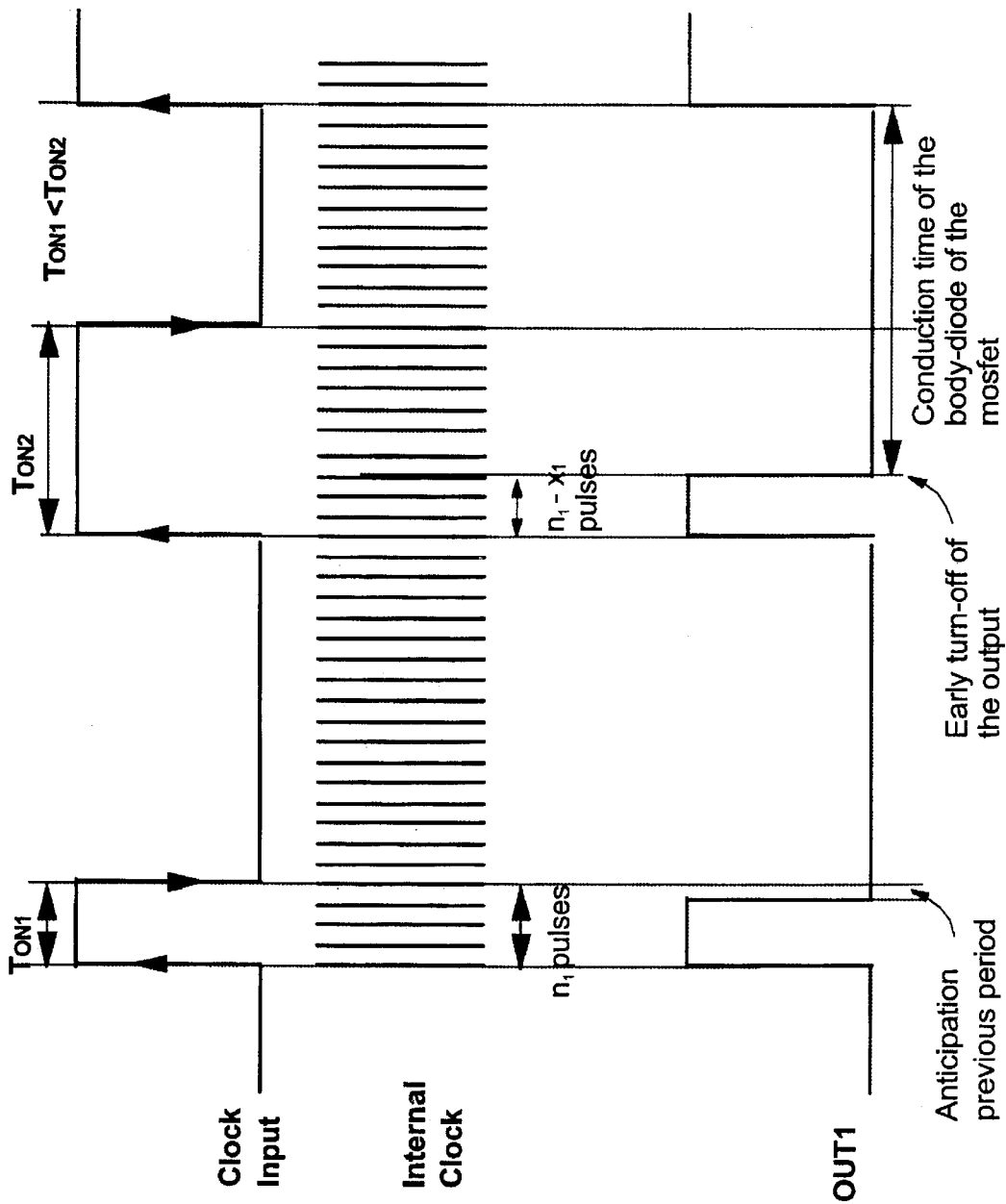

Second, the $T_{ON}$ time in which the anticipation is realized could be larger than the previous $T_{ON}$ time (FIG. 19). In this case, an early turn off of the $OUT_1$ occurs. The conduction time of the body-diode of the MOSFET is not minimized just for one cycle and the loss of efficiency is very low.

The disclosed method implements a cycle-by-cycle control because the measurement taken in a given period determines the action in the next subsequent period. By setting the values for $x_1$ and $x_2$, the amount of anticipation in turning-off the MOSFET synchronous rectifier is chosen among different discrete values. The time step is $T_1$, so the higher the internal oscillator frequency $f_1$ is, the more accurate the anticipation time is.

This method of controlling the turn off time of synchronous rectifiers is being implemented by STMicroelectronics, S.r.l., in the design of a silicon device family: STSR2: Device designed to drive two synchronous rectifiers in Forward Topology applications. This IC includes the described control system, two high current N-Channel MOSFET drivers and a clock buffer circuit used to adapt the clock signal to the accepted values, with the pin output shown in FIG. 20.

This device has an advanced version named STSR2A, in a 14 pin package, including the possibility of setting both anticipation times for the two turn-off transitions, and other features not pertinent with the topic of this application.

A STSR3 device is designed to drive one synchronous rectifier in Flyback Topology applications. This IC includes the described control system, with the same logic operation, but only for the part relative to $OUT_2$. It includes one high current N-Channel MOSFET driver and a clock buffer circuit needed to adapt the clock signal to the accepted values, with the pin output shown in FIG. 21.

A STSR4 device is designed to drive two synchronous rectifiers in Double-Ended Topology applications (Push Pull, Half Bridge, Full Bridge). The device includes a dual structure, based on the duplication of the described control systems for the part relative to $OUT_1$, two high-current N-Channel MOSFET drivers and two clock buffer circuits needed to adapt the clock signal to the accepted values, with the pin output shown in FIG. 22.

Figure 6:
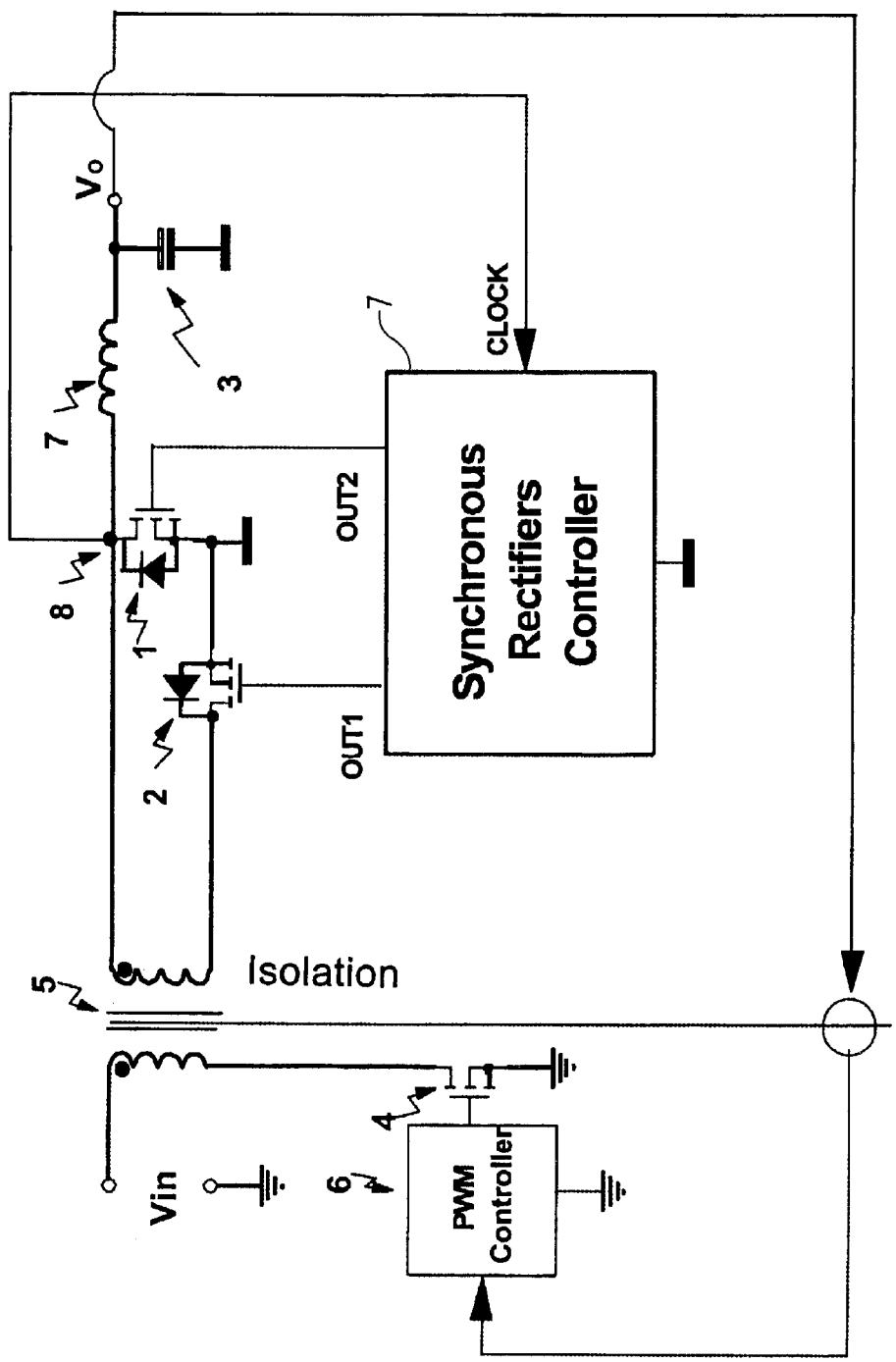
FIG. 6 is a schematic diagram of a single ended forward topology power supply according to the prior art.
Figure 7:
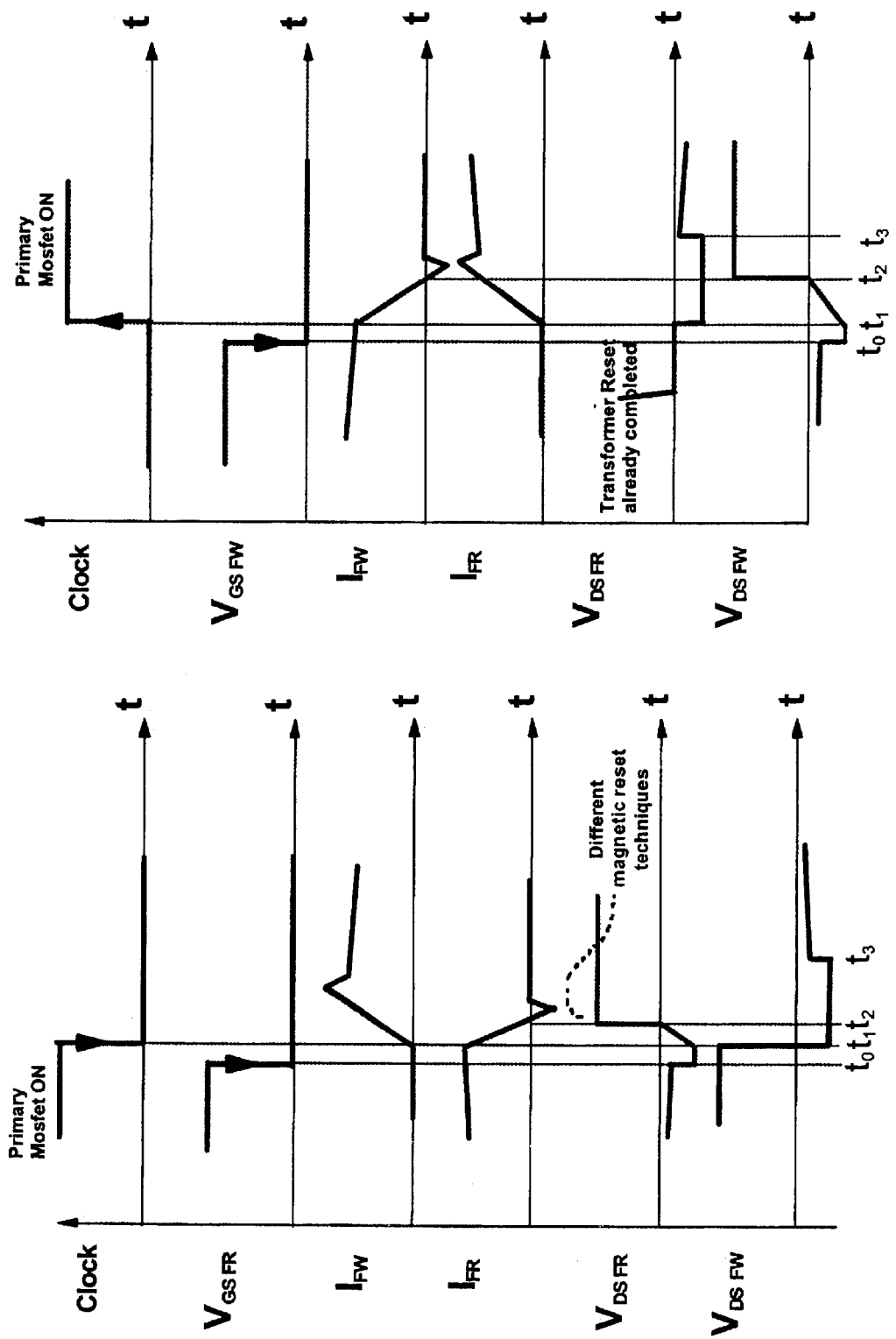
FIG. 7 is a timing diagram showing signals of the single ended forward topology power supply according to FIG. 6.
Figure 8:
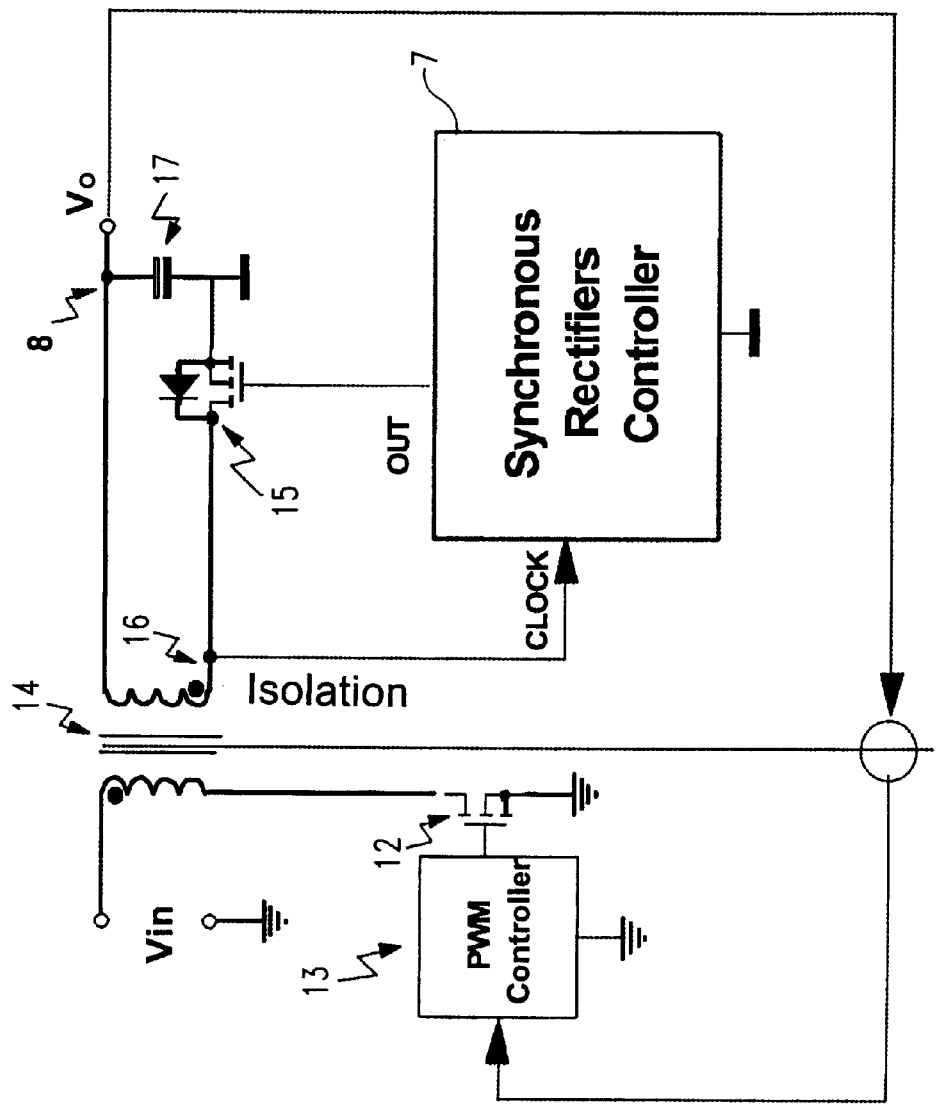
FIG. 8 is a schematic diagram of a single ended flyback topology circuit according to the prior art.
Figure 9:
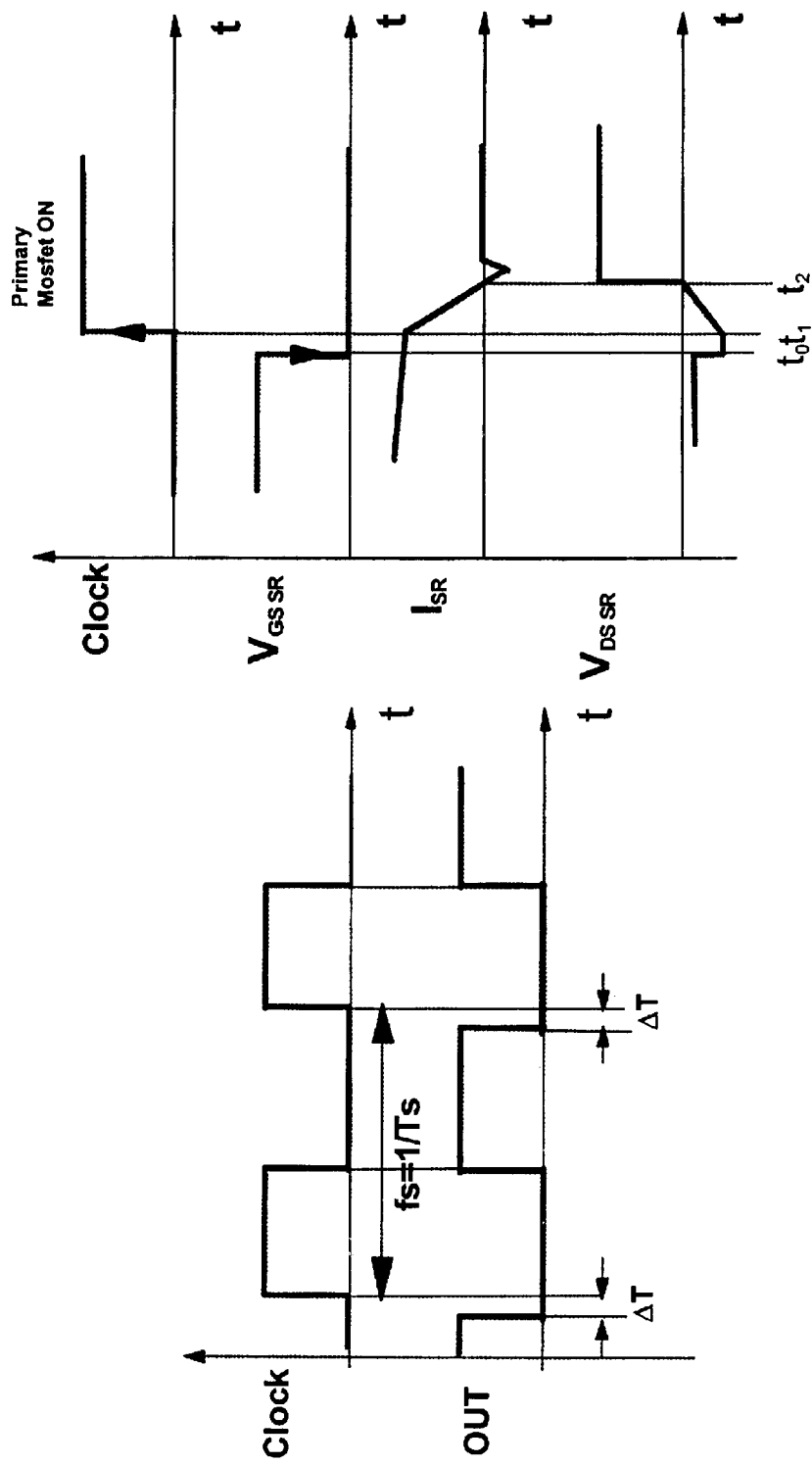
FIG. 9 is a timing diagram showing timing signals of the flyback topology circuit shown in FIG. 8.
Figure 10:
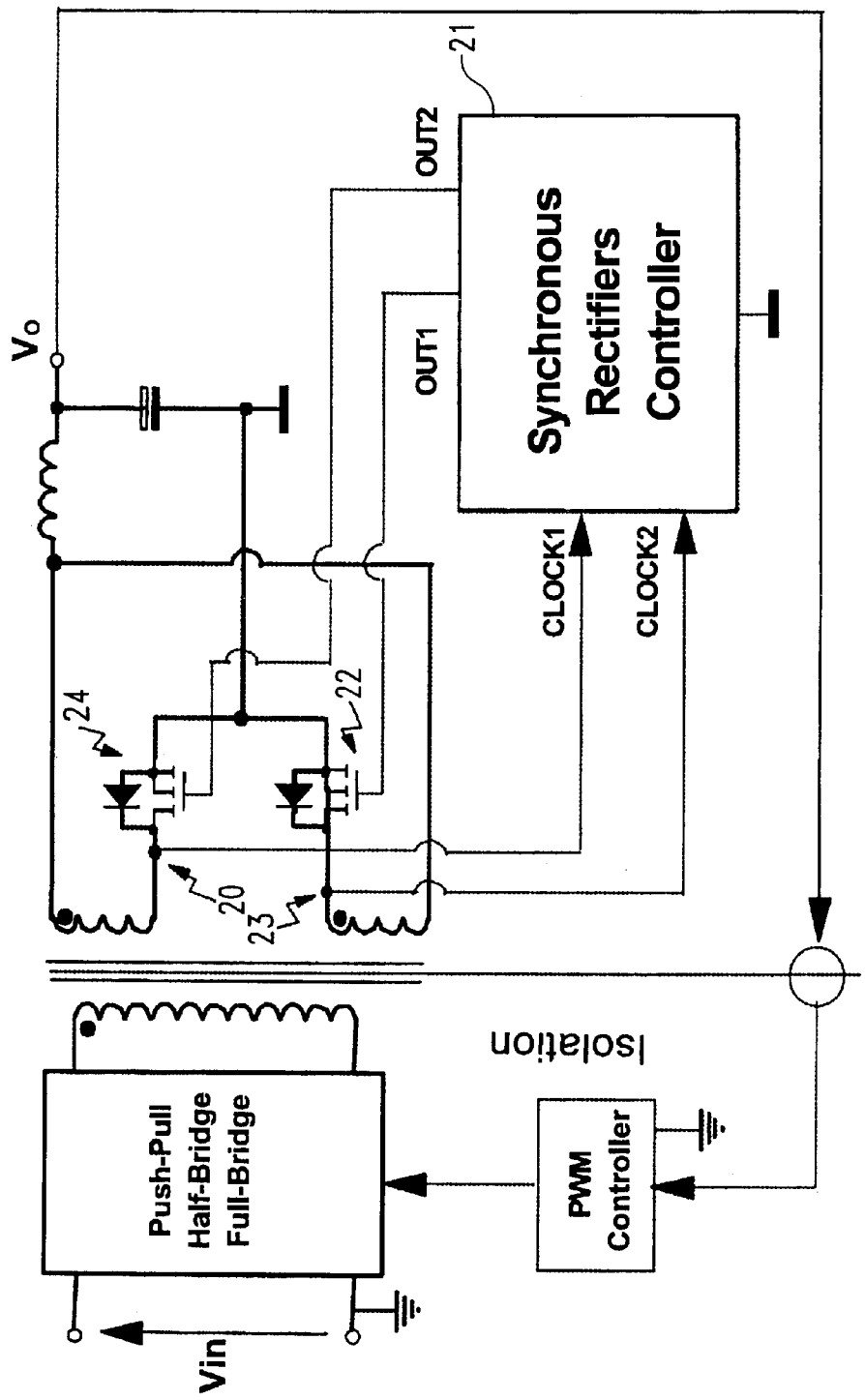
FIG. 10 is a schematic diagram of a doubled ended topology circuit according to the prior art.
Figure 11:
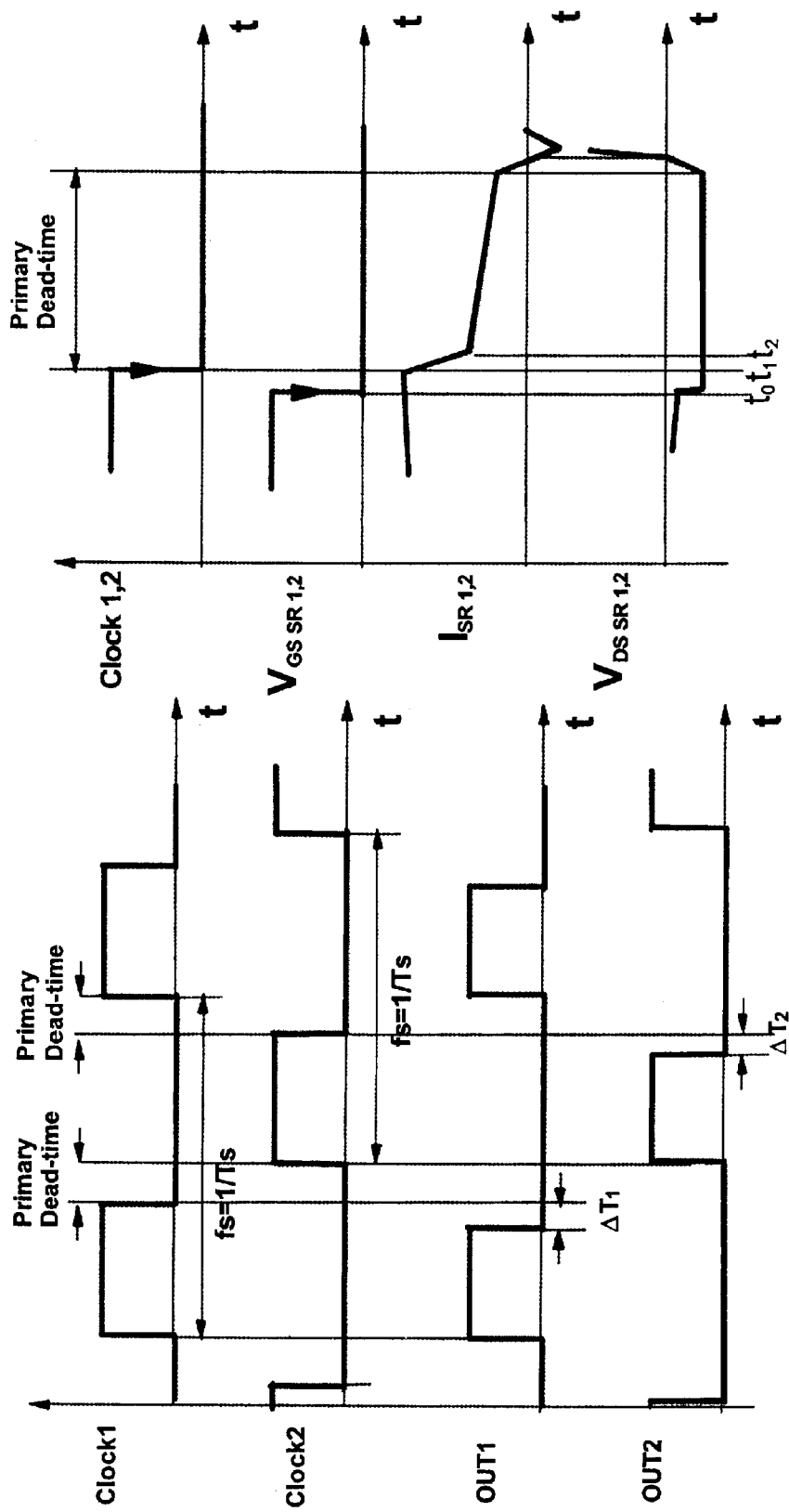
FIG. 11 is a timing diagram showing timing signals of the double ended circuit shown in FIG. 10.
Figure 20:
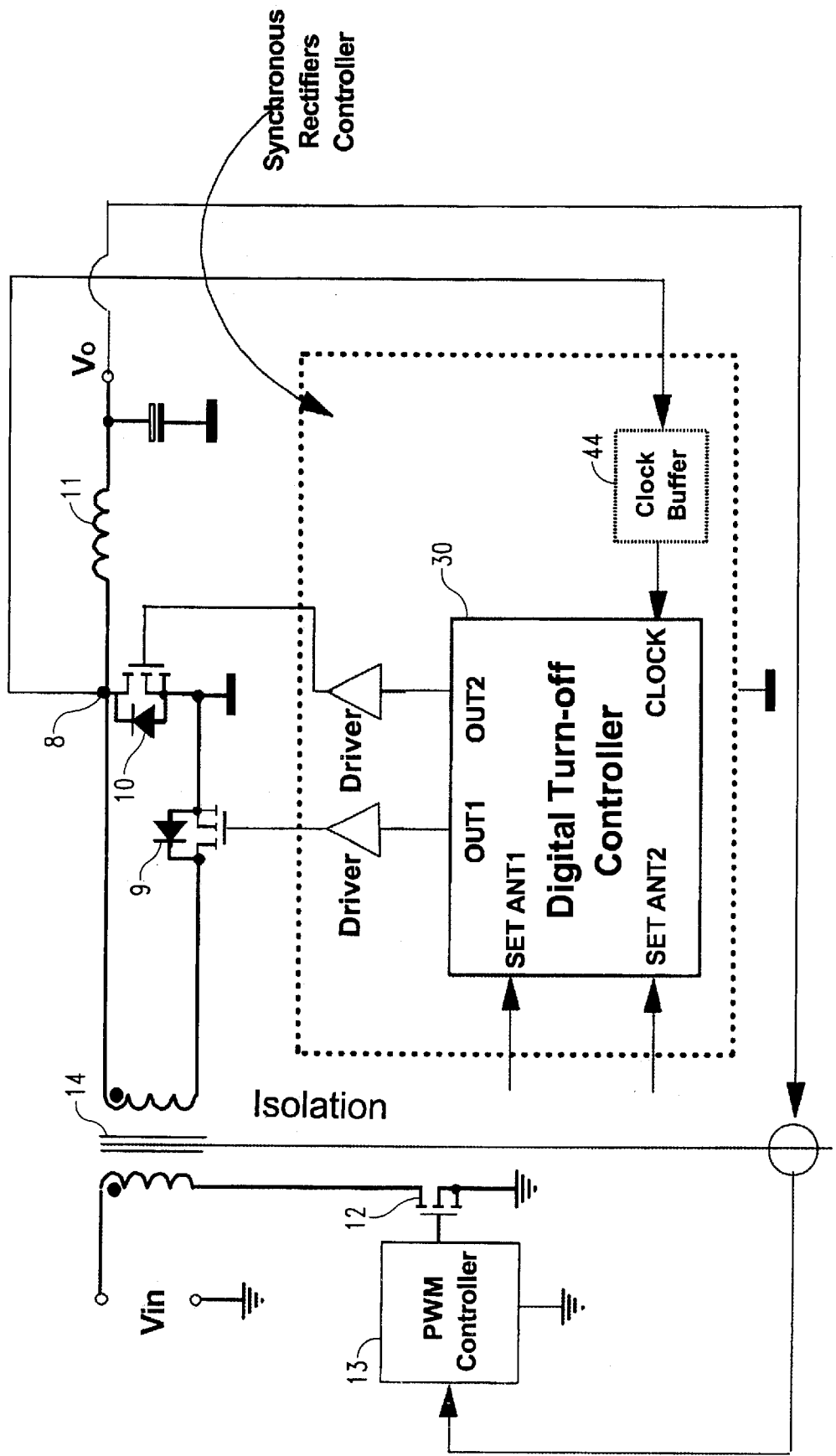
FIGS. 20–22 are schematic diagram showing pin configurations of devices including an embodiment of the inventive digital controller.
Figure 21:
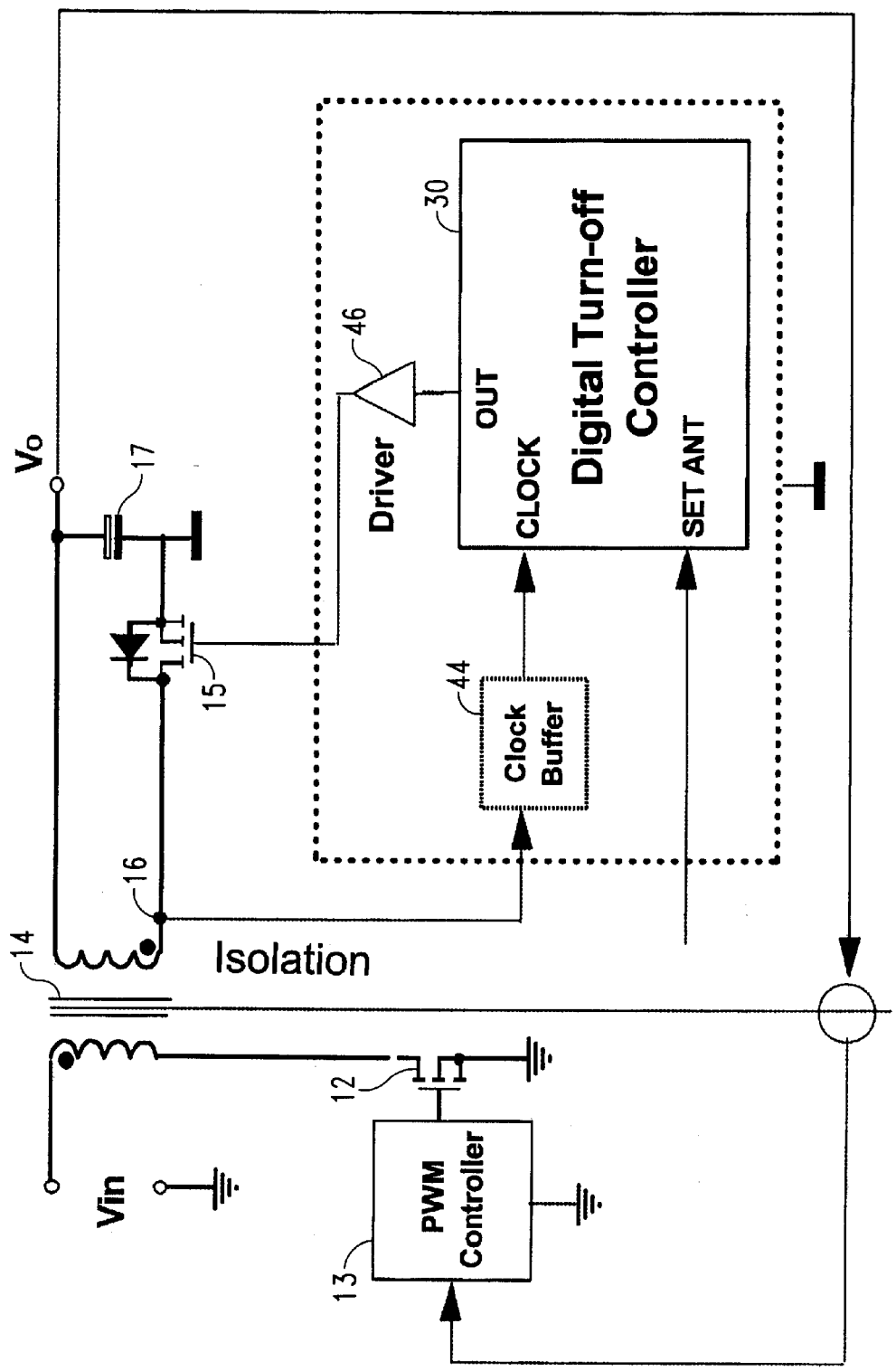
Figure 22:
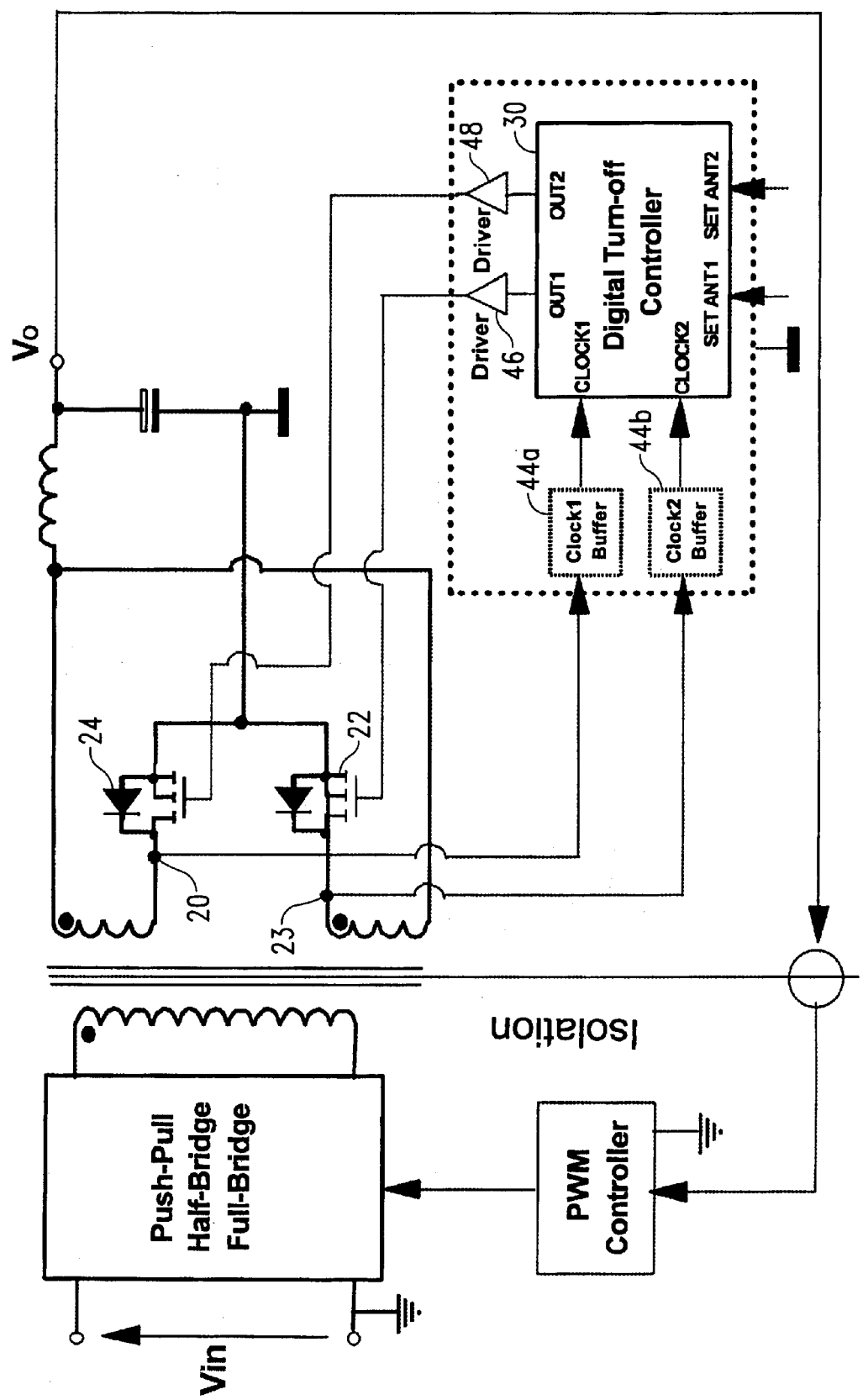

The elements of the power supply circuits shown in FIGS. 20–22 are referred using numbers of the corresponding elements of FIGS. 6, 8, and 10, respectively. For conciseness, those elements with operations and functions that are the same in FIGS. 20–22 compared to FIGS. 6, 8, 10 are not described in more detail herein.

The circuits of FIGS. 20–21 do include a clock buffer 44 for buffering the clock signal being input to the digital controller 30 and the circuit of FIG. 22 includes first and second clock buffers 44a, 44b for buffering the two clock signals being input to the digital controller. Also, the circuits of FIGS. 20 and 22 include two drivers 46, 48 for driving the respective synchronous rectifiers with the respect output signals $OUT_1$, $OUT_2$ and the circuit of FIG. 21 includes a single driver 46 for driving the single synchronous rectifier with the output signal OUT.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A switched mode power supply having an output terminal, comprising:
   a transformer having a set of primary and secondary windings;
   a primary power transistor coupled to the primary windings of the transformer;
   a PWM controller coupled to and providing a switching control signal to the primary power transistor;
   a first switched synchronous rectifier having at least one terminal connected to the secondary windings of the transformer;
   a clock signal generation circuit that generates a clock signal; and
   a digital control circuit for controlling the first switched synchronous rectifier, the digital control circuit having an input terminal for accepting a digital input value and a clock input that receives the clock signal, the digital control circuit being structured to generate a driving control signal directly related to the clock signal and the digital input value, and provide the driving control signal to the first switched synchronous rectifier.

2. The switched mode power supply according to claim 1 wherein the switched synchronous rectifier is a MOSFET, and the driving control signal is coupled to a control gate of the MOSFET.

3. A switched mode power supply having an output terminal, comprising:
   a transformer having a set of primary and secondary windings;
   a PWM controller structured to provide a PWM control signal to a primary power transistor coupled to the primary windings of the transformer;
   a first MOSFET synchronous rectifier having at least one terminal coupled to the secondary windings of the transformer;
   a circuit structured to generate a clock signal having a first frequency;
   an anticipation circuit for providing a driving signal for a control gate of the first MOSFET synchronous rectifier, including
   a terminal for accepting a first anticipation signal;
   a terminal for accepting the clock signal;
   an oscillator for generating an internal clock signal having a second frequency higher than the first frequency;
   a first counter for counting a first number of pulses of the internal clock signal during a first period of the clock signal;
   a second counter for counting a second number of pulses of the internal clock signal during a second period of the clock signal, the second period subsequent to the first period; and
   an output controller coupled to the second counter, and structured to generate the driving signal based on the second number of pulses of the internal clock signal counted by the second counter.

4. The power supply according to claim 3 wherein the first anticipation signal represents an integer number, and wherein the second number of pulses of the internal clock signal is determined by the first number of pulses of the internal clock signal less the integer number.

5. The power supply according to claim 3, further comprising:
   a second MOSFET synchronous rectifier having at least one terminal connected to the secondary windings of the transformer;
   a terminal for accepting a second anticipation signal;
   a counter for counting a third number of pulses of the internal clock signal between a rising and a subsequent falling edge of the clock signal;
   a fourth counter for counting a fourth number of pulses of the internal clock signal, the fourth counter beginning counting at a rising edge of the clock signal subsequent to that used in deriving the third number; and
   a second output controller coupled to the fourth counter, and structured to generate a second control signal for a control gate of the second MOSFET synchronous rectifier when the fourth number of the internal clock signals is reached by the fourth counter.

6. The power supply according to claim 5 further comprising a finite state machine coupled to the first, second, third and fourth counters.

7. The power supply according to claim 3 wherein the clock signal is derived from the secondary windings of the transformer.

8. The power supply according to claim 3 wherein the power supply has an isolated topology.

9. In a power supply including a transformer, a PWM controller, a primary power transistor, a first MOSFET synchronous rectifier connected to the transformer, a clock signal generator, and a control circuit coupled to a control gate of the first MOSFET synchronous rectifier, a method for generating a control signal to drive the control gate of the first MOSFET synchronous rectifier, the method comprising:
   accepting an anticipation signal at a terminal of the control circuit;
   generating an internal clock signal within the control circuit;
   counting a first number of pulses of the internal clock signal that are generated during a first period of the clock signal;
   subtracting the anticipation signal from the first number of pulses of the internal clock signal to produce a second number;
   counting the second number of pulses of the internal clock signal beginning at a subsequent period of the clock signal; and
   outputting the control signal when the second number of pulses of the internal clock signal are counted.

10. The method for generating a control signal of claim 9 wherein the power supply further comprises a second MOSFET synchronous rectifier connected to the transformer, the second MOSFET synchronous rectifier including a control gate, and wherein the method further comprises:

accepting a second anticipation signal at a second terminal of the control circuit;

counting a third number of pulses of the internal clock signal that are generated between a rising and a falling edge of the clock signal;

subtracting the second anticipation signal from the third number of pulses of the internal clock signal to produce a fourth number;

counting the fourth number of pulses of the internal clock signal beginning at a second rising edge of the clock signal;

generating a second control signal when the fourth number is counted; and providing the second control signal to the control gate of the second MOSFET synchronous rectifier.

11. The method for generating a control signal of claim 9 wherein the clock signal is generated based on a signal from the secondary windings of the transformer.

12. A switched mode power supply, comprising:

a transformer having a set of primary and secondary windings;

a primary power transistor coupled to the primary windings of the transformer;

a switched synchronous rectifier having at least one terminal connected to the secondary windings of the transformer; and a digital control circuit coupled to the switched synchronous rectifier, the digital control circuit for controlling the first switched synchronous rectifier, and including an input terminal for accepting an anticipation value, a clock input terminal for accepting a clock signal, an internal clock generator for generating an internal clock signal, and a comparison circuit for generating a control signal based on a comparison of the clock signal and the internal clock signal using the anticipation value, the control signal coupled to the first switched synchronous rectifier.

13. The switched mode power supply of claim 12 wherein the comparison circuit further comprises a first and a second counter.

14. The switched mode power supply of claim 12 wherein the comparison circuit further comprises a finite state machine.

15. The switched mode power supply of claim 12, further comprising a second switched synchronous rectifier having at least one terminal connected to the secondary windings of the transformer, and wherein the digital control circuit further includes a second input terminal for accepting a second anticipation value, and a second comparison circuit for generating a second control signal based on a comparison of the clock signal and internal clock signal using the second anticipation value, the second control signal coupled to the second switched synchronous rectifier.

16. A method of driving a MOSFET synchronous rectifier in a switched mode power supply, comprising:

accepting an anticipation value at an input terminal of a control circuit;

accepting, at a second input terminal, a first clock signal having a first frequency;

generating a second clock signal having a second frequency different than the first frequency, comparing the first clock signal and the second clock signal using the anticipation value; and generating a driving signal for the MOSFET synchronous rectifier based on the comparison of the first clock signal to the second clock signal.

17. The method of claim 16 wherein comparing the first clock signal and the second clock signal comprises using a set of counters to count a first number of pulses of the second clock signal generated during a first period of the first clock signal;

subtracting the anticipation value from the first number to obtain a second number; and counting the second number of pulses of the second clock signal beginning at a subsequent period of the first clock signal.

18. The method of claim 16 wherein comparing the first clock signal and the second clock is controlled by a pair of counters and a finite state machine.

19. The method of claim 16, further comprising:

accepting a second anticipation value at a third input terminal of a control circuit;

comparing the first clock signal and the second clock signal using the second anticipation value; and generating a second driving signal for a second MOSFET synchronous rectifier in the switched mode power supply based on the comparison of the first clock signal to the second clock signal using the second anticipation value.

* * * * *

UNITED STATES PATENT AND TRADEMARK OFFICE
CERTIFICATE OF CORRECTION

| | |
|---|---|
| PATENT NO. | : 6,418,039 B2 |
| APPLICATION NO. | : 09/832315 |
| DATED | : July 9, 2002 |
| INVENTOR(S) | : Franco Lentini et al. |

It is certified that error appears in the above-identified patent and that said Letters Patent is hereby corrected as shown below:

Column 11
Lines 24-25 claim 1, "coupled to the primary windings of the transformer;" should read as -- coupled to the primary winding of the transformer; --

Line 29 claim 1, "connected to the secondary windings" should read as -- connected to the secondary winding --

Line 51 claim 3, "primary windings of the transformer;" should read as -- primary winding of the transformer; --

Line 54 claim 3, "coupled to the secondary windings" should read as -- coupled to the secondary winding --

Column 12
Line 17 claim 5, "connected to the secondary windings" should read as -- connected to the secondary winding --

Line 37 claim 7, "derived from the secondary windings" should read as -- derived from the secondary winding --

Column 13
Lines 25-26 claim 12, "coupled to the primary windings of the transformer;" should read as -- coupled to the primary winding of the transformer; --

Line 29 claim 12, "connected to the secondary windings" should read as -- connected to the secondary winding --

UNITED STATES PATENT AND TRADEMARK OFFICE
CERTIFICATE OF CORRECTION

PATENT NO. : 6,418,039 B2
APPLICATION NO. : 09/832315
DATED : July 9, 2002
INVENTOR(S) : Franco Lentini et al.

It is certified that error appears in the above-identified patent and that said Letters Patent is hereby corrected as shown below:

Column 14
Line 1 claim 15, "connected to the secondary windings" should read as -- connected to the secondary winding --

Signed and Sealed this

Twenty-sixth Day of August, 2008

JON W. DUDAS
*Director of the United States Patent and Trademark Office*